(12) United States Patent
Peterson

(10) Patent No.: US 10,274,811 B2
(45) Date of Patent: Apr. 30, 2019

(54) EDGE LIGHT DEVICE FOR PHOTOGRAPHY SYSTEM

(71) Applicant: Lifetouch Inc., Eden Prairie, MN (US)

(72) Inventor: Trygve D. Peterson, Savage, MN (US)

(73) Assignee: Lifetouch Inc., Eden Prairie, MN (US)

( * ) Notice: Subject to any disclaimer, the term of this patent is extended or adjusted under 35 U.S.C. 154(b) by 18 days.

(21) Appl. No.: 15/435,377

(22) Filed: Feb. 17, 2017

(65) Prior Publication Data

US 2018/0239219 A1 Aug. 23, 2018

(51) Int. Cl.
| | |
|---|---|
| *G03B 11/04* | (2006.01) |
| *G03B 15/04* | (2006.01) |
| *G03B 15/07* | (2006.01) |

(52) U.S. Cl.
CPC .......... *G03B 15/041* (2013.01); *G03B 11/048* (2013.01); *G03B 15/07* (2013.01)

(58) Field of Classification Search
CPC .. G03B 21/20; G03B 21/2013; G03B 15/041; G03B 15/07; G03B 15/02; G03B 15/0442
USPC ...................................................... 362/11, 16
See application file for complete search history.

(56) References Cited

U.S. PATENT DOCUMENTS

| | | | | |
|---|---|---|---|---|
| 3,763,366 A | * | 10/1973 | Bahnsen ................ | G03B 15/03 362/16 |
| 3,941,992 A | * | 3/1976 | Blount ............... | G03B 15/0442 362/13 |
| 4,690,637 A | * | 9/1987 | Brower .............. | G03B 15/0457 362/11 |
| 7,896,509 B2 | * | 3/2011 | Gallagher ............. | G03B 17/00 362/11 |
| 8,128,247 B2 | * | 3/2012 | Portmann ............. | G03B 15/05 362/11 |
| 8,376,602 B2 | * | 2/2013 | Klipstein ................. | F21L 4/08 362/612 |

* cited by examiner

*Primary Examiner* — William N Harris
(74) *Attorney, Agent, or Firm* — Merchant & Gould P.C.

(57) ABSTRACT

An edge light device of the present disclosure creates edge light effects, such as spectral highlight or artistic effect, on a subject. The edge light device emits light to provide an illumination zone which can be generally out of the field of view of the camera. The edge light device includes a housing having features for controlling light to create edge light effects on a subject. In certain examples, the housing provides a light blocker for concentrating light toward the subject and blocking the light from illuminating the other areas, such as the camera, in the photography station. The housing further includes at least one aperture that cooperates with the light blocker and defines a light passage through which the light is directed toward the subject.

19 Claims, 17 Drawing Sheets

EDGE LIGHT DEVICE FOR PHOTOGRAPHY SYSTEM

BACKGROUND

A major difference between amateur and professional photography is the quality of the lighting. A professional photographer conducting a portrait photography session may spend hours customizing the lighting to create various effects for a particular subject. The photographer has numerous tools available to obtain the ideal lighting conditions, including a variety of different light sources.

In high volume professional photography, the photographer does not have the time to customize the lighting conditions for every subject. Instead, the lighting system of the photography station is configured to accommodate subjects as best as possible, but variations in subject position make it difficult to obtain uniformly complimentary light. Additionally, in portable photography studios, space constraints, such as low ceiling height, limit lighting configuration. As a result, limitations are also imposed on the photographer's subject posing options as well as on the possible positions of the camera.

SUMMARY

In general terms, this disclosure is directed to an edge light device for a photography system. In one possible configuration and by non-limiting example, the edge light device includes a housing having one or more apertures to selectively radiate light for edge effects. Various aspects are described in this disclosure, which include, but are not limited to, the following aspects.

One aspect is an edge light assembly for a photography system. The edge light assembly includes a housing defining an interior configured to at least partially receive a light source. The light source is configured to emit light. The housing includes a light blocker at least partially surrounding the light source and blocking the light from reaching a camera of the photography system; and at least one aperture provided at the housing and configured to define a light passage through which the light is directed toward a subject space between a background and the camera.

Another aspect is a photography system including a digital camera, a foreground light assembly, an edge light assembly, and a controller. The digital camera is arranged and configured to capture a digital image of a subject. The edge light assembly includes a housing defining an interior configured to at least partially receive a light source. The light source is configured to emit light. The housing includes a light blocker at least partially surrounding the light source and blocking the light from reaching a camera of the photography system; and at least one aperture provided at the housing and configured to define a light passage through which the light is directed toward a subject space between a background and the camera. The controller operable to control the photography system to: illuminate the subject with the foreground light assembly; illuminate the subject with the edge light assembly; and capture a digital image with the digital camera.

Yet another aspect is a photography method including setting up a photography station by: arranging a digital camera with respect to a subject space; arranging a foreground light assembly with respect to the subject space; and aligning an edge light assembly with the subject space, the edge light assembly including a housing defining an interior configured to at least partially receive a light source. The light source is configured to emit light. The housing includes a light blocker at least partially surrounding the light source and blocking the light from reaching the camera of the photography system; and at least one aperture provided at the housing and configured to define a light passage through which the light is directed toward the subject space. The method further includes operating a controller to synchronize operations of the digital camera, the foreground light assembly, and the edge light assembly.

DETAILED DESCRIPTION

Figure 1:
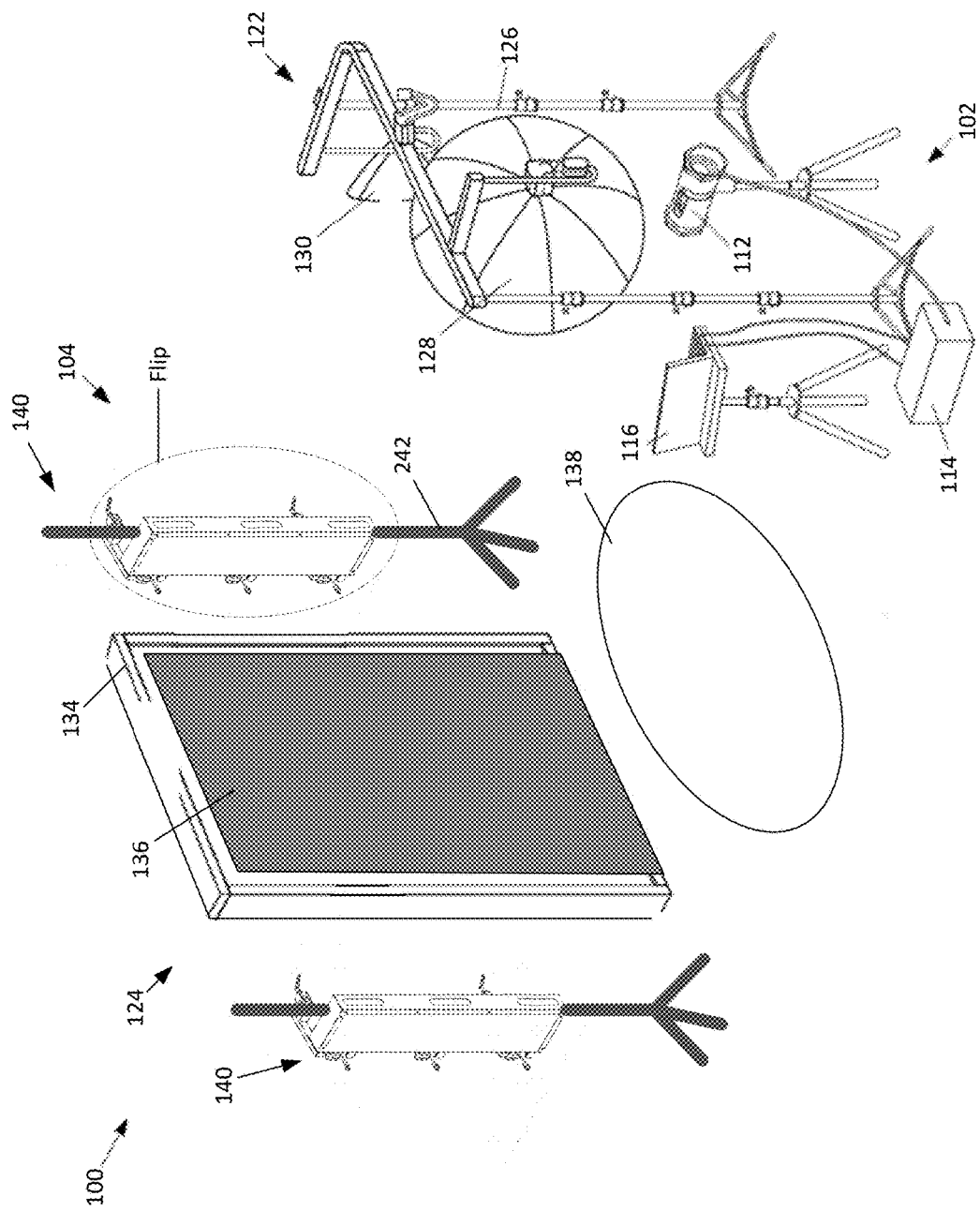
FIG. 1 is a schematic perspective diagram of an example photography station.

Various embodiments will be described in detail with reference to the drawings, wherein like reference numerals represent like parts and assemblies throughout the several views.

In general, the edge light device of the present disclosure replaces existing rim lights to create predetermined edge light effects, such as spectral highlight or artistic effect, on a subject. The edge light device is configured to be easily incorporated with existing photography stations. Further, the edge light device provides consistent light to predetermined locations, which are reproducible. The edge light device also provides an error proofing solution for creating special edge effects on subjects of various attributes, such as height, body shape, and posture.

The edge light device of the present disclosure emits light to provide an illumination zone which can be generally out of the field of view of the camera. For example, the edge light device is configured and arranged such that the light from the edge light device does not illuminate the lens of the camera.

In certain embodiments, the edge light device of the present disclosure includes a housing having features for controlling light to create edge light effects on a subject. For example, the housing is shaped to provide a light blocker for concentrating light toward the subject and blocking the light from illuminating the other areas, such as the camera, in the photography station. The housing further includes at least one aperture that cooperates with the light blocker and defines a light passage through which the light is directed toward the subject.

The housing defines an interior for at least partially receiving a light source. The interior of the housing can be configured to be non-reflective. In certain embodiments, the housing of the edge light device provides one or more edges, such as straight edges, for aligning the edge light device with a subject or a predetermined marker of the subject or a subject space on which the subject is located.

FIG. 1 is a schematic perspective diagram of an example photography station 100. In one example, the photography station 100, which is also referred to herein as a photography system, includes an image capture system 102 and a station assembly 104. In some embodiments, the image capture system 102 includes a camera 112, a controller 114, and a computing device 116. In some embodiments, the station assembly 104 includes a forward portion 122 and a rearward portion 124. The forward portion 122 includes, for example, a stand 126 that supports a main light 128 and a fill light 130. The rearward portion 124 includes a scene support 134 that supports a photographic scene 136, such as a background scene and a floor scene. A subject space 138 is defined between the forward portion 122 and the rearward portion 124. The rearward portion 124 further includes one or more edge light devices 140. In some embodiments, the subject space 138 is defined by an area that can be captured by a field of view of the camera.

The image capture system 102 operates to capture an image of one or more subjects in the photography studio, and, in some embodiments, to control the overall operation of the photography station 100. For example, in some embodiments, the image capture system 102 performs a setup process to ensure that the photography station 100 is properly set up, to capture digital images of a subject, and to monitor the operation of the photography station 100 while the images are being captured to alert the photographer to potential problems.

The camera 112 is typically a digital camera that operates to capture digital images of one or more subjects. An example of camera 112 is described and illustrated in more detail herein with reference to FIG. 15.

The camera 112 is typically mounted on a tripod or other support structure. In some embodiments, the height of the camera 112 is adjusted by a motor coupled to a shaft of the tripod. When the motor rotates, the shaft of the tripod extends or contracts to raise or lower the camera 112. In some embodiments, the camera 112 is mounted to the shaft at a fixed and non-variable angle relative to the vertical shaft of tripod. In other embodiments, the camera 112 is mounted to be adjustable in angle and/or orientation relative to the vertical shaft of tripod.

The controller 114 operates to control and coordinate the operation of various components of the photography station 100. An example of controller 114 is described in more detail with reference to FIG. 16.

In this example, the controller 114 is electrically connected to the camera 112, the computing device 116, and lights (such as the lights 128, 130, and 140), via, for example, one or more wires or data communication cables.

In another possible embodiment, wireless communication is used to communicate between a wireless communication device of the controller 114 and a wireless communication device of one or more of the camera 112 and the lights. An example of a wireless communication protocol is the 802.11 a/b/g/n communication protocol. Other embodiments use a custom wireless communication protocol. Wireless communication includes radio frequency communication, infrared communication, magnetic induction communication, or other forms of wireless data communication.

The computing device 116 operates, in some embodiments, to interface with a user, such as the photographer. An example of the computing device 116 is described in more detail with reference to FIG. 17. In some embodiments, the computing device 116 generates a graphical user interface, such as to provide instructions to the user, warn the user of potential problems, display a live video feed preview from camera 112, and display an image after it has been captured.

The computing device 116 also operates to receive input from the user in some embodiments. In some embodiments, the computing device 116 includes a keyboard, a touch pad, a remote control, and a barcode scanner that receive input from the user.

In some alternate embodiments, one or more of the camera 112, the controller 114, and/or the computing device 116 are a single device. For example, in some embodiments, the camera 112 and the controller 114 are configured as a single device that captures digital images and performs control operations of controller 114. In another possible embodiment, the controller 114 and the computing device 116 are a single device. In yet another possible embodiment, the camera 112, the controller 114, and the computing device 116 are all a single device. Other combinations are used in other embodiments. Further, in yet other embodiments additional devices are used to perform one or more functions of these devices.

In some embodiments, the station assembly 104 generally includes the forward portion 122 and the rearward portion 124. The forward portion 122 is configured to be positioned in front of a subject when an image of the subject is captured. The rearward portion 124 is configured to be positioned behind the subject when an image of the subject is captured. The subject is placed at the subject space 138, which is located between the forward portion 122 and the rearward portion 124.

In this example, the forward portion 122 includes the stand 126 that supports the main light 128 and the fill light 130. Other embodiments include more or fewer lights. In some embodiments, the main and fill lights 128 and 130 include a flash bulb and a diffuser that surrounds the bulb. In other embodiments, the main and fill lights 128 and 130 are configured to provide continuous lighting for several purposes. For example, the continuous lighting is used for recording videos. The lights 128 and 130 are synchronized and controlled by controller 114.

The rearward portion 124 includes one or more edge light devices 140. In addition to the edge light devices 140, in some embodiments, the rearward portion 124 can include one or more lights, such as a background light. The rearward portion 124 further includes the scene support 134 that supports the photographic scene 136, such as a background scene and a floor scene.

The edge light device 140 is a light device configured to generate light placed on the subject and provide the appearance of a light outline to the subject. The edge light device 140 creates an edge light effect which separates the subject from the background and offers some depth and dimension to the subject in the photograph. In this document, the edge light device can also be referred to as a rim light, back light, hair light, shoulder light, or a kicker light. An example of the edge light effect is illustrated with reference to FIG. 2.

The background light is provided to illuminate the photographic scene 136. In this example, the background light is arranged forward of the photographic scene 136. In other embodiments, the background light is arranged behind the scene support 134. The background light is preferably arranged so that it does not significantly illuminate a side of the subject that is facing the camera 112.

The scene support 134 is configured to hold the photographic scene 136 in place. In some embodiments, the photographic scene 136 is hung at a top portion of the scene support 134. In other embodiments, the photographic scene 136 is supported by the scene support 134 in any manner.

The photographic scene 136 provides an area or scenery behind the subjects standing in front of the image capture system 102. The subject is arranged between the image capture system 102 and the photographic scene 136. In some embodiments, the photographic scene 136 includes a background scene and a floor scene.

Figure 2:
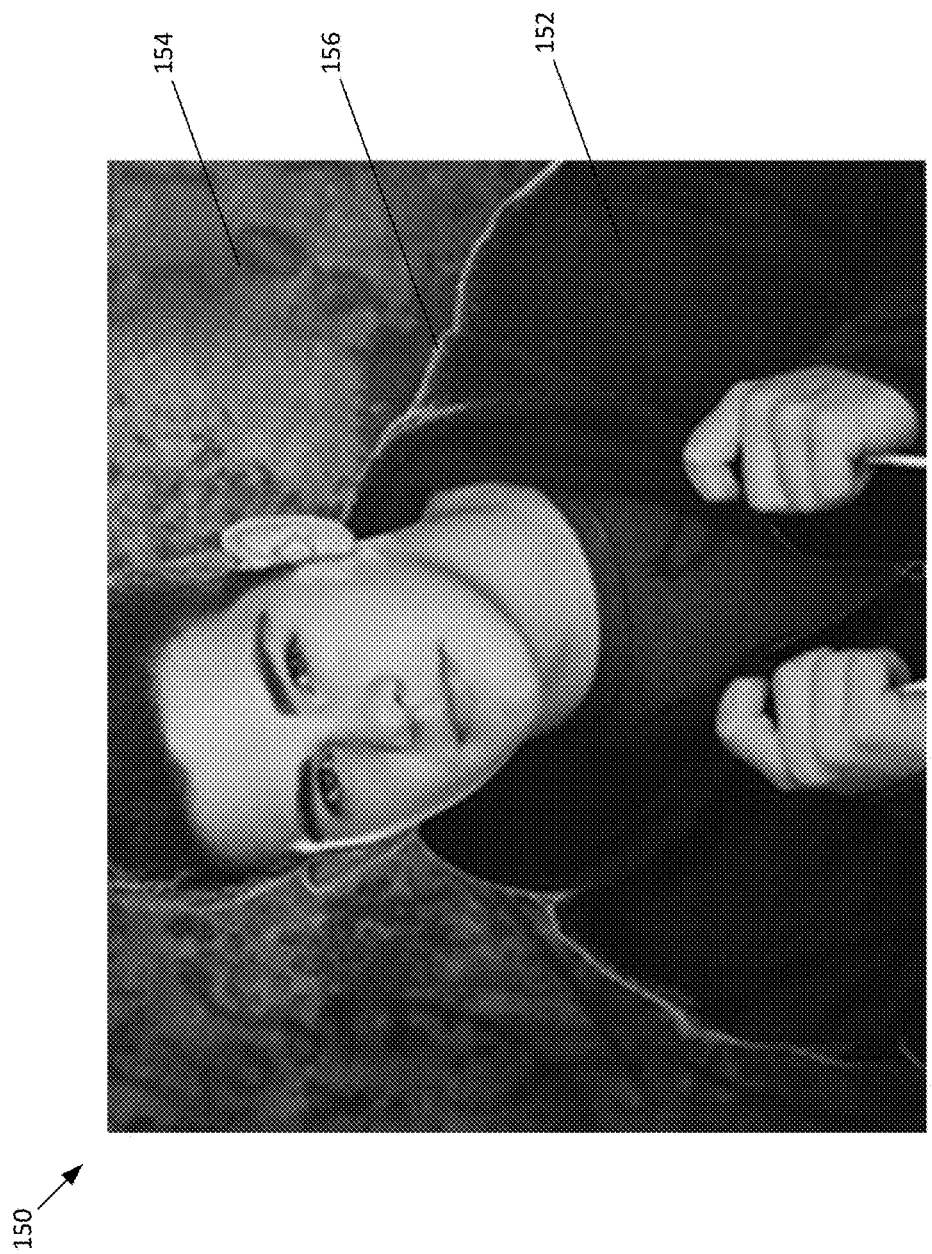
FIG. 2 is an example photograph captured with the photography station.

FIG. 2 is an example photograph 150 captured with the photography station 100. The photograph 150 includes a subject 152 with a background 154. In some embodiments, the background 154 is included in the photograph 150 using a photographic scene (such as background and floor) replacement technology, such as chroma key technology and other suitable technologies. Examples of the photographic scene replacement technologies are described in U.S. Pat. No. 7,834,894, titled METHOD AND APPARATUS FOR BACKGROUND REPLACEMENT IN STILL PHOTOGRAPHS, issued Nov. 16, 2010, and U.S. Patent Application Publication No. 2015/0347845, titled PHOTOGRAPHIC SCENE REPLACEMENT SYSTEM, filed May 30, 2014, the disclosures of which are hereby incorporated by reference in their entireties.

The photograph 150 shows an edge light effect 156 around the edge of the subject 152. The edge light effect 156 is created by the light radiated from the edge light device 140 and hitting the back of the subject 152.

One of the benefits of the edge light effect 156 is that it can illuminate edges of the subject to provide a clear separation between the subject 152 and the background 154. Without the edge light effect 156, dark colors of a subject's clothing may be nearly indistinguishable from dark background colors, for example. The edge light effect 156 provides a clear separation between the subject 152 and the background 154. Additionally, the edge light effect 156 can also provide additional depth and dimension perspective to the subject in the photograph, to show that the subject is positioned forward of and is spaced from the background.

In some embodiments, the edge light effect 156 is generated by the edge light device 140 that is used to illuminate the subject from the back. In some embodiments, the edge light effect is used to create a specific style of lighting. For example, the edge light effect 156 can provide a glowing effect on the edges of the subject while the other area is darker. The edge light effect 156 can also be sued to create a glow around edges of the subject, which can generate a somewhat harsh or edgy artistic effect that is desirable for certain styles of photography.

Referring to FIGS. 3-7, an example structure of the edge light device 140 is described.

Figure 3:
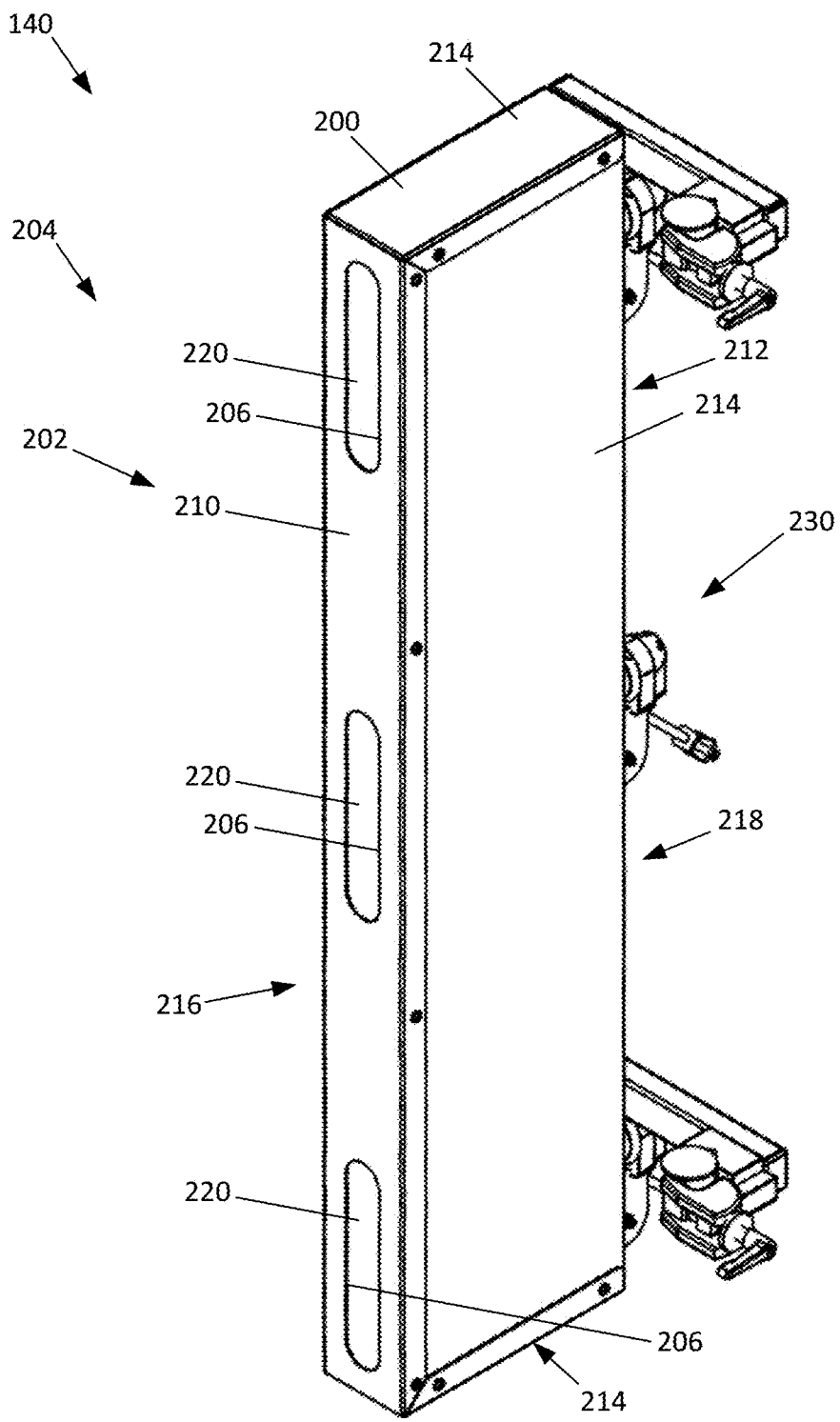
FIG. 3 is a front perspective view of an example edge light device.

FIG. 3 is a front perspective view of the edge light device 140. The edge light device 140 includes a housing 200 having a light blocker 202 and a light passage 204. The light blocker 202 includes a front panel 210, a rear panel 212, and side panels 214. The light passage 204 includes at least one aperture 220. A light source 230 is also shown.

The housing 200 is configured to mount the light source 230 that emits light. The housing 200 includes various features for selectively passing the light therethrough in a predetermined way, as described below.

In some embodiments, the housing 200 is configured as a rectangular box having the front panel 210, the rear panel 212, and the side panels 214. The front panel 210 is arranged to generally face the subject arranged at the subject space 138 when the edge light device 140 is set up. As described herein, the rear panel 212 is configured to mount the light source 230 so that the light source 230 emits light from a rear end 218 of the housing to a front end 216 of the housing. In other embodiments, the housing 200 has other suitable shapes.

The housing 200 is made of various materials. As described herein, the housing 200 defines an interior 208 (FIGS. 8 and 9) into which the light source 230 is at least partially received. The inner surface of the housing 200, which defines the interior 208, is made of non-reflective. For example, the interior of the housing 200 is formed of a material that absorbs most or all of the light from the light source. Alternatively, when the housing 200 is made of one material, such as plastic, metal, or glass, the interior of the housing 200 can be coated with one or more layers of material that absorb most or all of the light from the light source.

The light blocker 202 is configured to at least partially surround the light source 230 and block the light from reaching the camera 112 of the photography station 100. In some embodiments, the light blocker 202 is defined by panels or walls of the housing 200, such as the front panel 210, the rear panel 212, and the side panels 214.

The light passage 204 is formed by the housing 200 and is configured to direct the light from the light source 230 toward the subject space 138 between the forward portion 122 and the rearward portion 124. In some embodiments, the light passage 204 includes at least one aperture 220 through which the light passes as the light blocker 202 blocks the light. The light blocker 202 and the aperture 220 cooperate to direct the light to pass only through the aperture 220 of the housing 200. In some embodiments, the light passage 204 includes a plurality of apertures 220. In the illustrated embodiment, three apertures 220 are provided. In other embodiments, the light passage 204 includes a single aperture 220 with either a fixed size or an adjustable size. An example configuration of the aperture 220 is further illustrated and described with reference to FIGS. 8-13.

Figure 5:
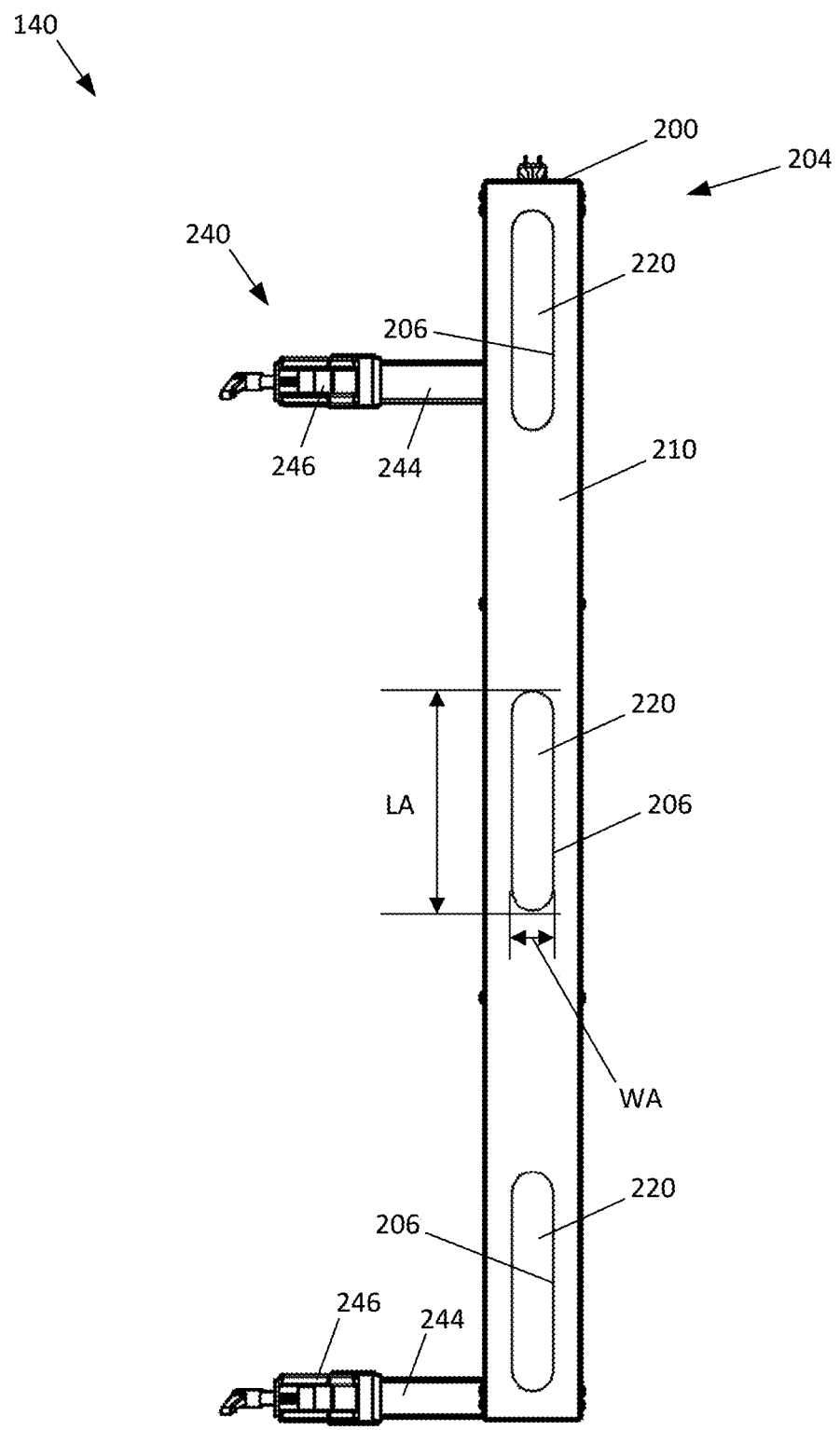
FIG. 5 is a front view of the edge light device of FIG. 3.

The inner edges 206 of the light blocker 202 define the outer peripheries of the apertures 220 and therefore define the maximum radiation angles that may proceed toward the subject. In this example, the inner edges are elliptical. Other embodiments have other shapes, such as circular, square, rectangular. As shown in FIG. 5 below, the width $W_A$ of the inner edges 206 (or the aperture 220) defines the maximum horizontal radiation angle $A_{L2}$ (FIG. 9) of light that is permitted to pass through the housing 200. The height $L_A$ of the inner edges 206 (or the aperture 220) defines the maximum vertical radiation angle $A_{L1}$ (FIG. 8) of light that is permitted to pass through the housing 200. As described herein, the width of the inner edges is smaller than the height of the inner edges to limit the horizontal radiation of light toward the subject, but not toward the camera.

Figure 4:
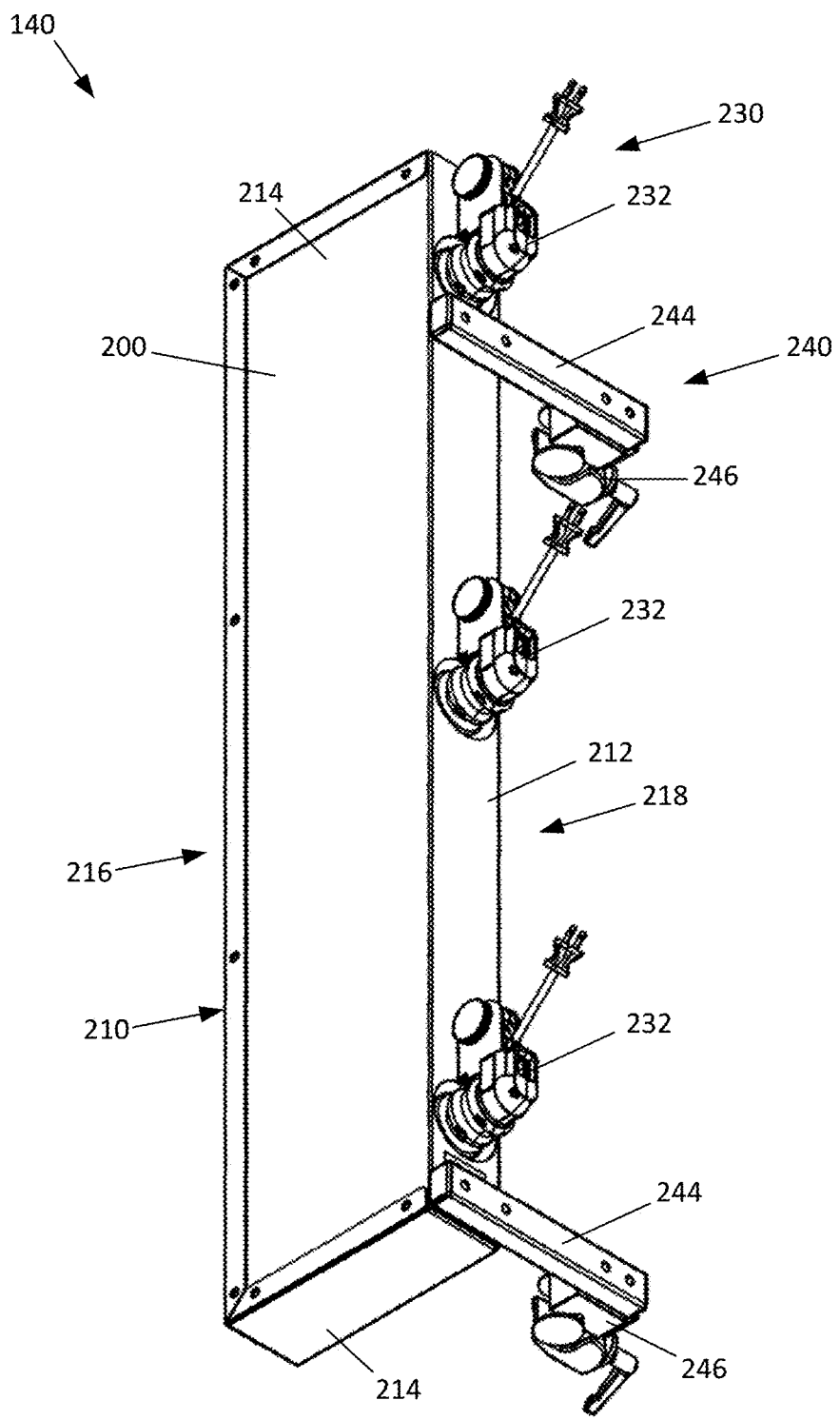
FIG. 4 is a rear perspective view of the edge light device of FIG. 3.

FIG. 4 is a rear perspective view of the edge light device 140. As illustrated, the edge light device 140 includes a support device 240, as well as the light source 230, at the rear end 218 of the housing 200.

The light source 230 includes at least one lighting device 232 mounted to the housing 200. In some embodiments, the lighting device 232 can be mounted to the rear panel 212 of the housing 200. An example configuration of the lighting device 232 is illustrated and described with reference to FIGS. 8 and 9.

Figure 8:
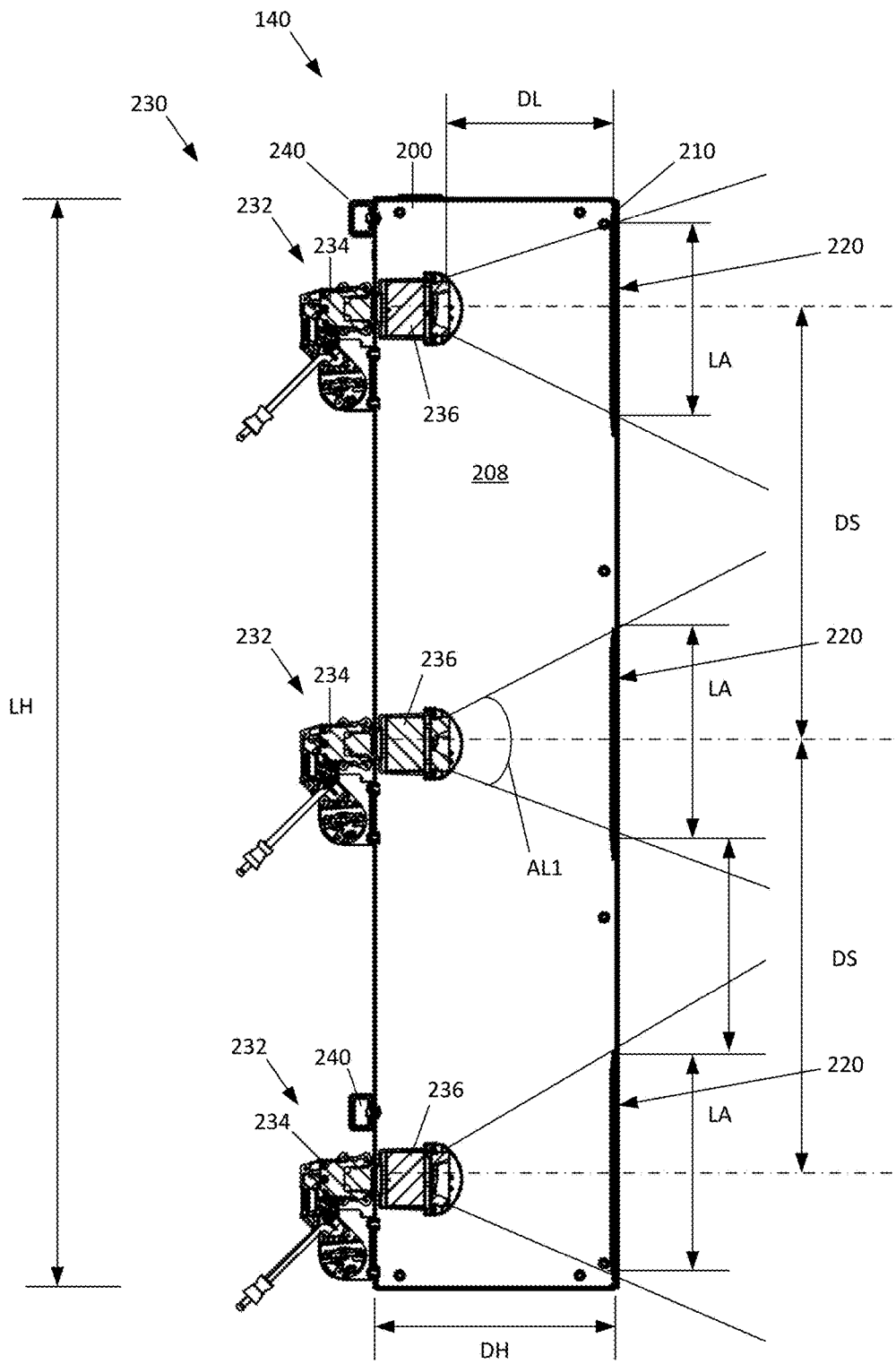
FIG. 8 is a cross sectional view of the edge light device, taken along line A-A of FIG. 6.

The support device 240 is configured to mount the edge light device 140 to a light stand 242 (FIGS. 1 and 8). In some embodiments, the support device 240 operates to detachably mount the edge light device 140 to the light stand 242. In some embodiments, the support device 240 includes a support bar 244 and a clamping device 246.

The support bar 244 is fixed to the housing 200 at one end and extends from the housing 200. The other end of the support bar 244 is configured to support the clamping device 246. In the illustrated embodiment, the support bar 244 is fixed to the rear panel 212 of the housing 200. The support bar 244 can be fastened to the housing 200 using fasteners, such as bolts or screws. In other embodiments, the support bar 244 can be attached to the housing 200 in different configurations, such as snap-fitting or interference-fitting.

Figure 10:
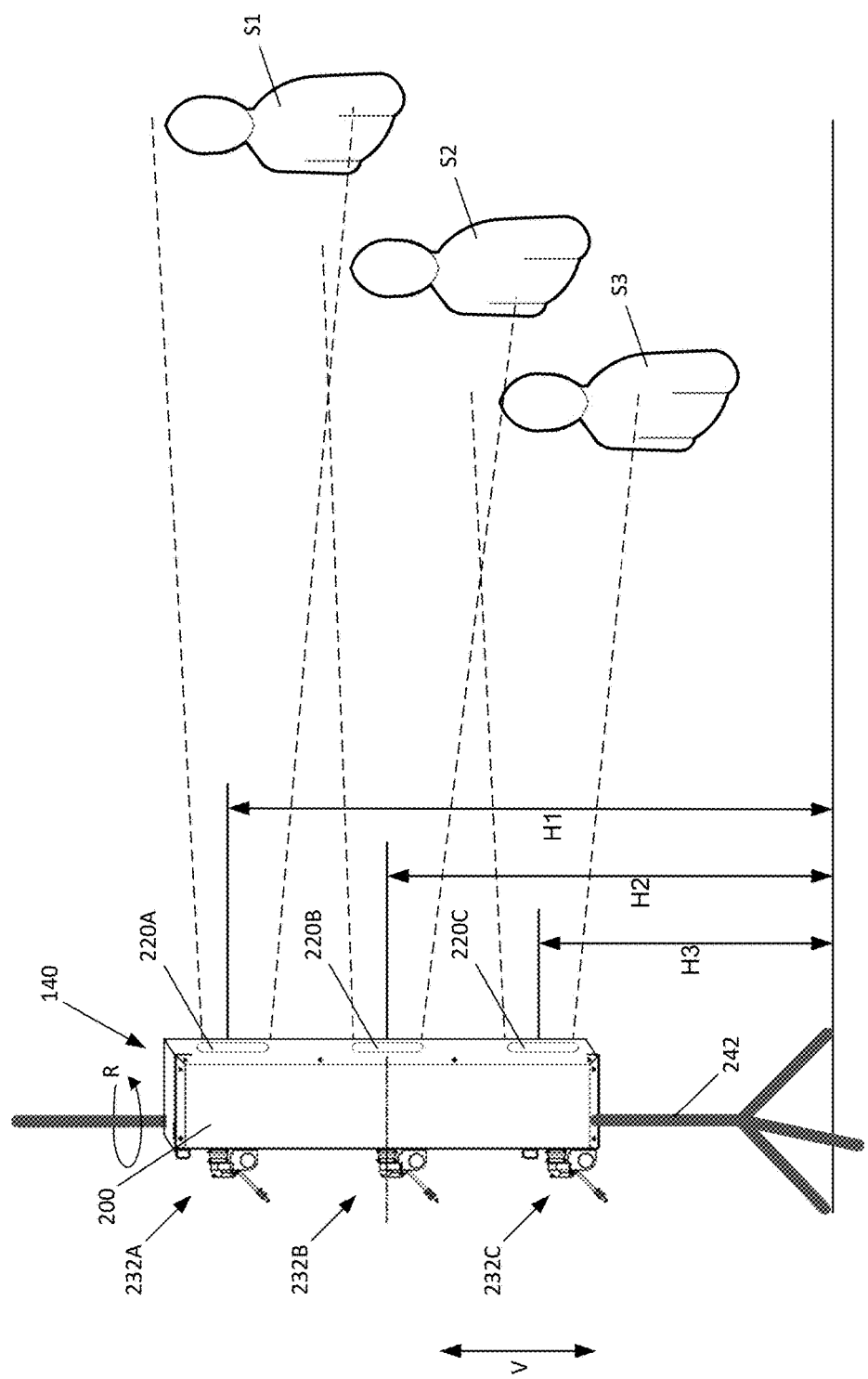
FIG. 10 illustrates an example operation of the edge light device.

The clamping device 246 is fixed to a free end of the support bar 244 opposite to the end of the support bar 244 coupled to the housing 200. The clamping device 246 is used to support and secure the housing 200 to the light stand 242. The clamping device 246 is further used to position the housing 200 relative to the light stand 242. For example, the clamping device 246 is configured to move the housing 200 relative to the light stand 242 to adjust the height of the edge light device 140 along a vertical direction V (FIG. 10). The clamping device 246 can also be used to rotate the housing 200 relative to the light stand 242 to change an angular position of the edge light device 140 along a rotational direction R (FIG. 10).

In some embodiments, the edge light device 140 includes a plurality of support device 240. In the illustrated embodiments, two support devices 240 are provided to the housing 200. In other embodiments, a single support device 240 is configured and used to support the housing 200 to the light stand 242.

The support device 240 can be used to mount the housing 200 of the edge light device 140 two symmetrical ways with respect to the light stand 242. For example, the support bar 244 can be detached and reversed 180 degrees with respect to the housing 200, and attached to the housing 200. Accordingly, the edge light device 140 can be coupled to the light stand 242 to extend either in one direction from the light stand 242 (e.g., the edge light device 140 on the left side in FIG. 1), or symmetrically in the opposite direction from the light stand 242 (e.g., the edge light device 140 on the right side in FIG. 1). In other embodiments, the support device 240 is configured to couple the edge light device 140 to the light stand 242 such that the longitudinal (i.e., vertical) center of the housing 200 of the edge light device 140 is arranged and aligned with the longitudinal (i.e., vertical) center of the light stand 242. Other coupling arrangements are also possible in yet other embodiments.

The light stand 242 is used to stabilize and elevate the edge light device 140. Examples of the light stand 242 include a tripod. Other types of the light stand 242 are also possible in other embodiments.

Figure 6:
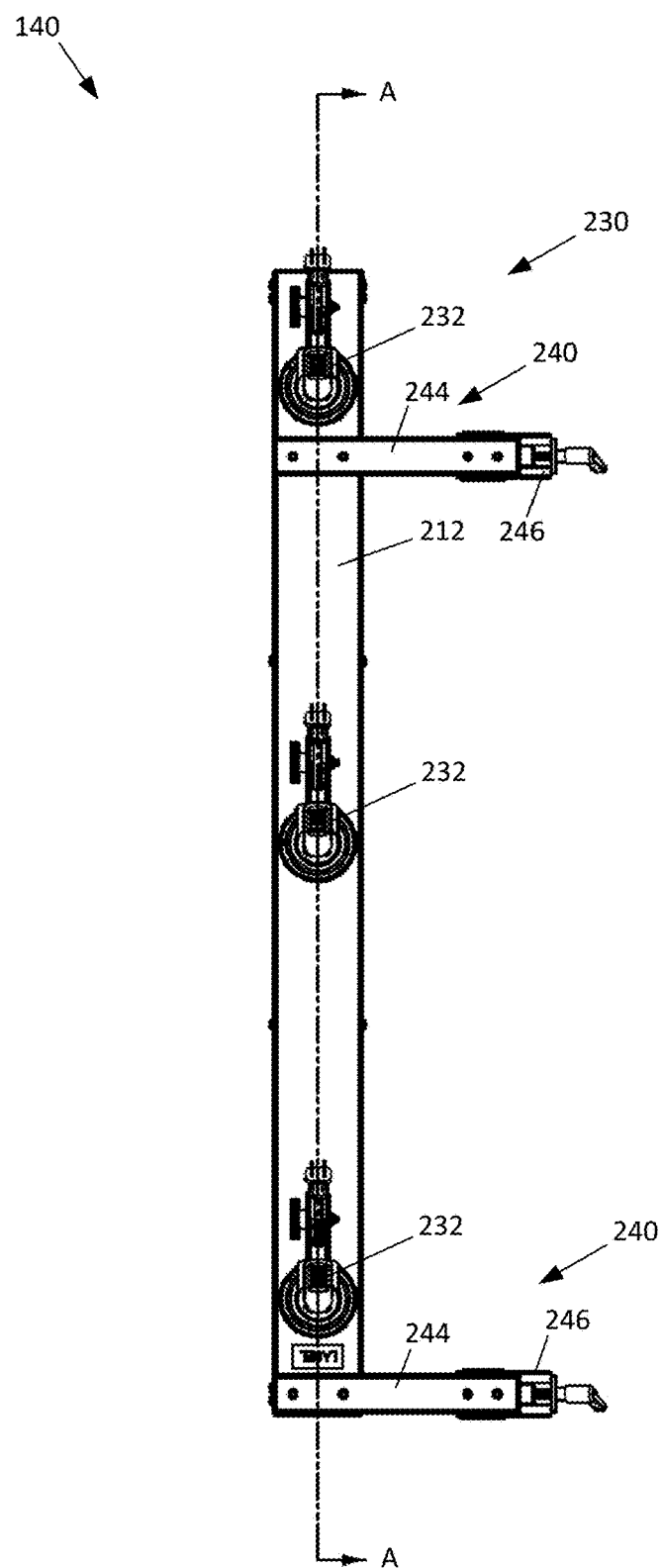
FIG. 6 is a rear view of the edge light device of FIG. 3.
Figure 7:
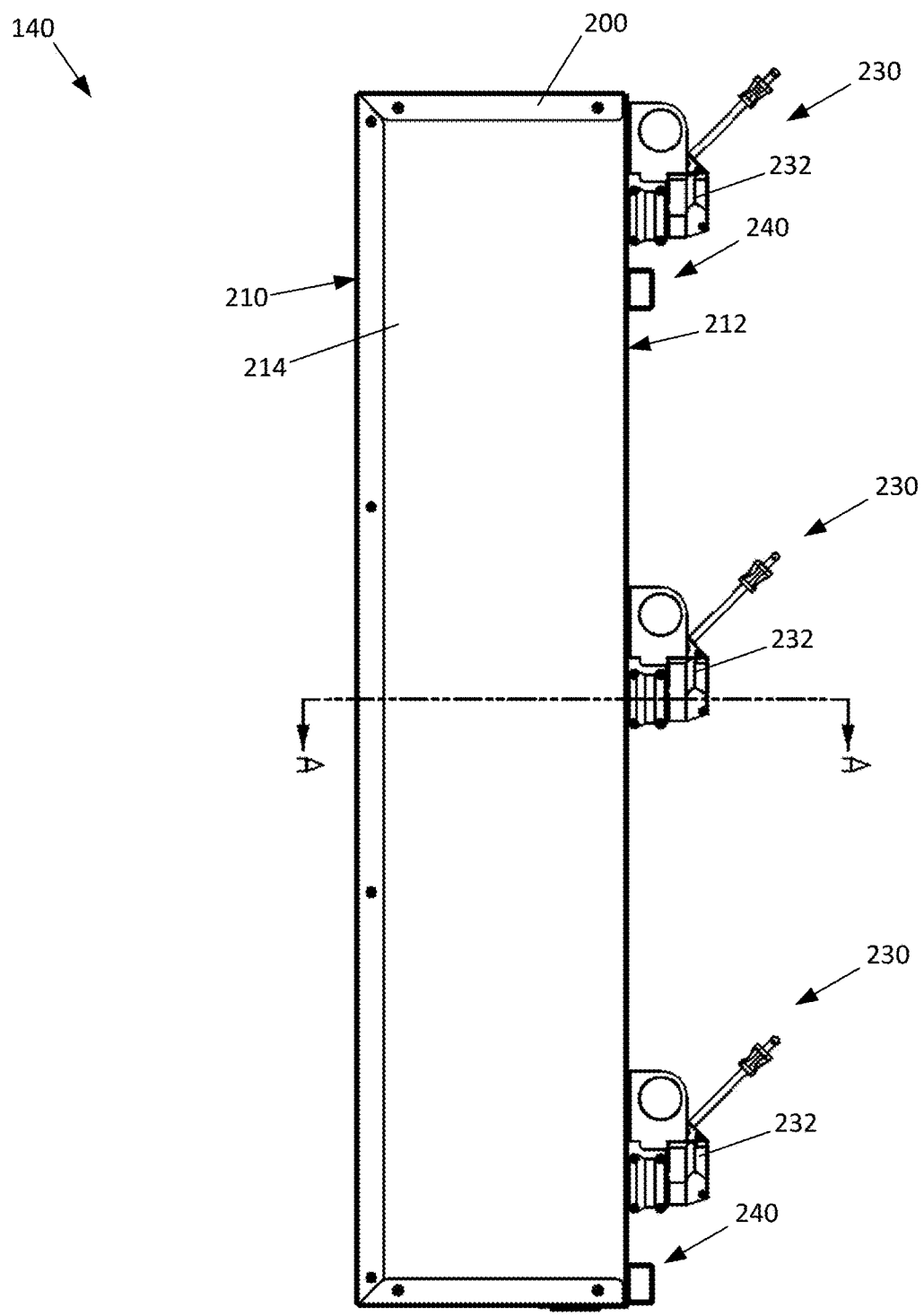
FIG. 7 is a side view of the edge light device of FIG. 3.

FIGS. 5-7 illustrate different views of the edge light device 140 of FIGS. 3 and 4. In particular, FIG. 5 is a front view of the edge light device 140, FIG. 6 is a rear view of the edge light device 140, and FIG. 7 is a side view of the edge light device 140. Various configurations, structures, and components are described above with reference to FIGS. 3 and 4.

Figure 9:
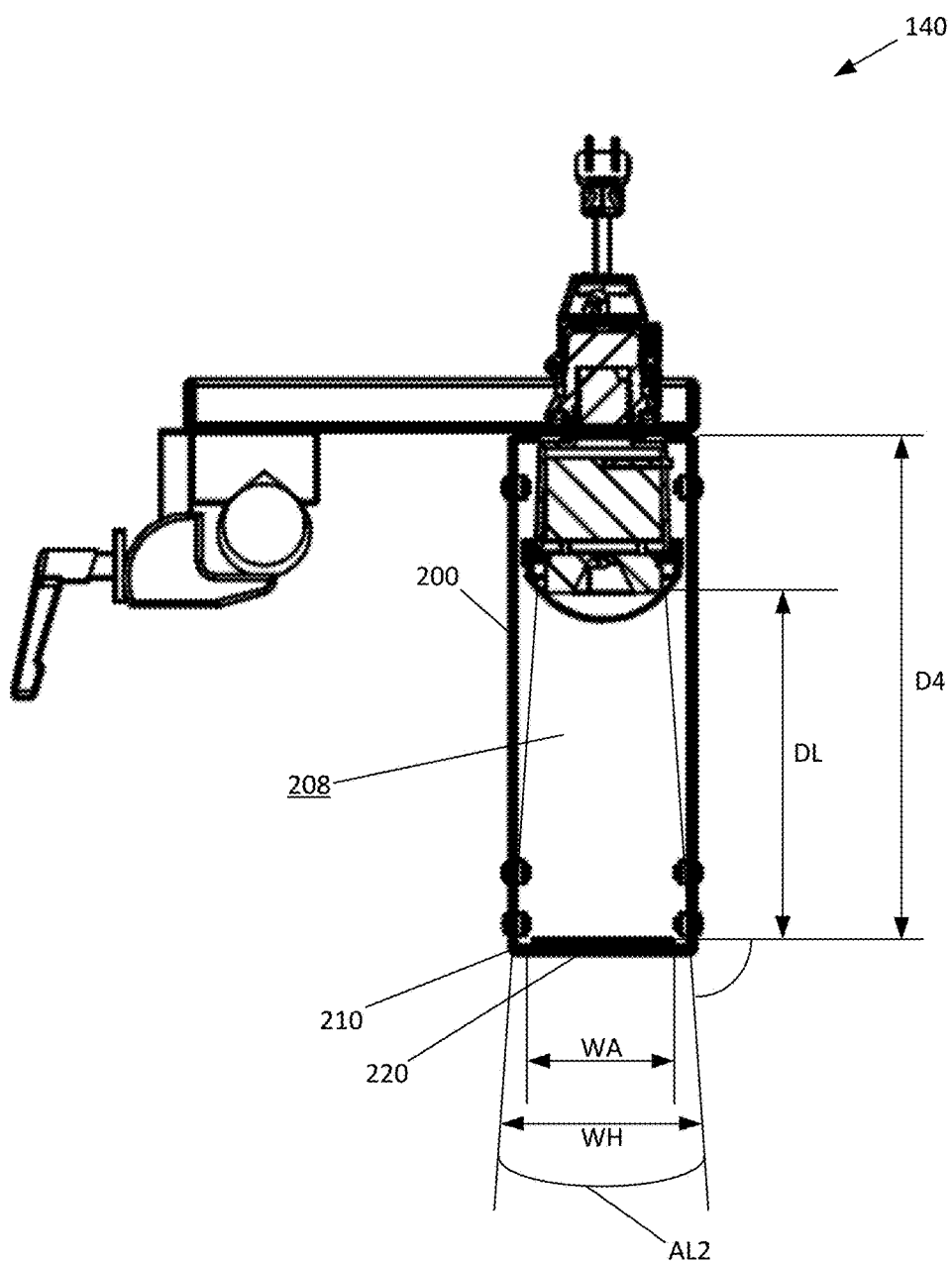
FIG. 9 is a cross sectional view of the edge light device, taken along line A-A of FIG. 7.

Referring to FIGS. 8 and 9, an example configuration of the edge light device 140 is described. In particular, FIG. 8 is a cross sectional view of the edge light device 140, taken along line A-A of FIG. 6, and FIG. 9 is a cross sectional view of the edge light device 140, taken along line A-A of FIG. 7.

As illustrated, the housing 200 is configured generally as a rectangular box having a length $L_H$, a width $W_H$, and a depth $D_H$. When the edge light device 140 is set up in the photography station 100, the length $L_H$ of the housing 200 is generally arranged along the vertical direction V (FIG. 10). In some embodiments, the housing 300 is configured such that the length $L_H$ is longer than the width $W_H$. In one example, a ratio between the length $L_H$ and the width $W_H$ ranges between about 2:1 and about 10:1. In another example, the ratio is between about 4:1 and about 8:1. In yet another example, the ratio is about 6:1.

As described herein, one of more lighting devices 232 of the light source 230 are arranged at the rear panel 212 of the housing 200. In the illustrated embodiment, three lighting devices 232 are provided, and three apertures 220 are correspondingly arranged in front of the lighting devices 232, respectively. In some embodiments, each of the lighting devices 232 is aligned with the center of the corresponding aperture 220, as illustrated with an alignment axis X in FIG. 8.

Each of the lighting devices 232 includes a socket assembly 234 and a lighting element 236. The socket assembly 234 is configured to receive and secure the lighting element 236, and provide electrical connections to the lighting element 236. The socket assembly 234 allows the lighting element 236 to be conveniently replaced. In some embodiments, the housing 200 includes through-holes on the rear panel 212. The socket assemblies 234 are arranged on the rear panel 212 at the exterior of the housing 200, and the lighting elements 236 are arranged on the rear panel 212 at the interior of the housing 200, such that the socket assemblies 234 and the lighting elements 236 are mated through the through-holes of the housing 200, respectively. For example, the lighting elements 236 have screw terminals which are screwed into the socket assemblies 234 for wire connections. Such screw terminals of the lighting elements 236 pass through the through-holes of the housing 200 to be coupled to the socket assemblies 234. Other mating configurations are also possible in other embodiments.

The lighting element 236 can be configured with various types of light bulbs. In some embodiments, a flashlight bulb is used to implement the lighting element 236. Other types of light bulbs can be used for the lighting element 236. In some embodiments, the lighting element 236 is configured to provide a brightness of about 45 watt seconds, when the light element is a flashlight bulb. The aperture is configured to stop the light that is heading in the wrong direction while the neutral density reduces the light by 2½ stops. In other embodiments, the light element is configured to provide a brightness between about 20 watt seconds and about 60 watt seconds. In yet other embodiments, the light element of other brightness can be used.

The lighting devices 232 are spaced apart along the length of the housing 200 (i.e., the vertical direction V in FIG. 10). In some embodiments, the lighting devices 232 are equally spaced apart at a distance $D_S$. In some embodiments, the distance $D_S$ can be determined based on various factors including the dimension (such as the length $L_H$, the width $W_H$, and the depth $D_H$) and shape (such as rectangular box, square box, cylindrical box, or rounded box) of the housing, the size (such as the length $L_A$ and the width $W_A$) and shape (such as circular, oval, square, or rectangular) of the apertures 220, the distance $D_L$ between the lighting devices 232 and the apertures 220, and the light characteristics (such as intensity and color) of the lighting devices 232. In some examples, the distance $D_S$ ranges from about 12 inches to about 24 inches. In other examples, the distance $D_S$ is about 18 inches. With the lighting devices are close together, they can be indistinguishable from a continuous strip of lights. Depending on the subject's size (e.g., height), they may be illuminated by one light or by a feathering of multiple lights (e.g., two) at a time. In other embodiments, at least some of the lighting devices 232 are arranged at different distances. Since the lighting devices 232 are aligned with the apertures 220, the apertures 220 are similarly spaced apart at the distance $D_S$.

The lighting devices 232 are arranged at a distance $D_L$ from the corresponding apertures 220 along the depth of the housing 200. The distance $D_L$ between the lighting devices 232 and the apertures 220 are determined based on various factors including the dimension (such as the length $L_H$, the width $W_H$, and the depth $D_H$) and shape (such as rectangular box, square box, cylindrical box, or rounded box) of the housing, the size (such as the length $L_A$ and the width $W_A$) and shape (such as circular, oval, square, or rectangular) of the apertures 220, the distance ($D_L$) between the lighting devices 232 and the apertures 220, and the light characteristics (such as intensity and color) of the lighting devices 232. In some examples, the distance $D_L$ ranges from about 4 inches to about 8 inches. In other examples, the distance $D_L$ is about 6 inches when the aperture is dimensioned 8×1½ inches such that the angle of horizontal light spread is controlled to 14 degrees. The distances $D_L$ and Ds are determined to provide a suitable compromise between having enough room for the subject to move around and also protect the camera from flare. In some embodiments, the distances between the lighting devices and the apertures are equal. In other embodiments, at least one of the distances $D_L$ between the lighting devices and the apertures are different from the other distances $D_L$ between the lighting devices and the apertures.

In some embodiments, the lighting devices 232 are manually turned on or off. In other embodiments, the controller 114 and/or the computing device 116 can be used to manually control the lighting devices 232. In other embodiments, the lighting devices 232 are automatically controlled by the controller 114 and/or the computing device 116, as programmed.

The apertures 220 can have various configurations. In the illustrated embodiment, the apertures 220 have a shape that is elongated along the length of the housing 200. Each of the apertures 220 has a length $L_A$ and a width $W_A$ that is narrower than the length $L_A$. In one example, a ratio between the length $L_A$ and the width $W_A$ ranges between about 2:1 and about 10:1. In another example, the ratio is between about 4:1 and about 8:1. In yet another example, the ratio is about 6:1. In some embodiments, the length $L_A$ ranges from about 4 inches to about 12 inches, and the width $W_A$ ranges from about 0.5 inches to about 2.5 inches. In other embodiments, the length $L_A$ is about 8 inches while the width $W_A$ is about 1.5 inches. This particular dimension is designed to illuminate a single subject of any height. Alternatively, the dimension of the apertures can vary to provide flexibility for individual subjects or groups of subjects, or possible alternatives.

In the illustrated example, the apertures 220 have rounded edges at the opposite longitudinal ends of the apertures (for example as shown in FIG. 5). In other embodiments, other shapes of the apertures 220 are also possible.

In some embodiments, all the apertures 220 have the same shape and arrangement. In other embodiments, at least one of the apertures 220 can have a different shape and/or arrangement from the other apertures.

As illustrated, the height $L_A$ of the aperture 220 defines the maximum vertical radiation angle $A_{L1}$ of light (FIG. 8) that is permitted to pass through the housing 200. In some examples, the maximum vertical radiation angle $A_{L1}$ ranges between about 10 degrees to about 170. The width $W_A$ of the aperture 220 defines the maximum horizontal radiation angle $A_{L2}$ of light (FIG. 9) that is permitted to pass through the housing 200. In some examples, the maximum horizontal radiation angle $A_{L2}$ ranges between about 5 degrees and about 40 degrees. In other examples, the maximum horizontal radiation angle $A_{L2}$ is about 14 degrees. The maximum horizontal radiation angle $A_{L2}$ can be determined to provide enough spread to illuminate the subject without causing flare in the camera. As described herein, the width of the inner edges is smaller than the height of the inner edges to limit the horizontal radiation of light toward the subject, but not toward the camera.

FIG. 10 illustrates an example operation of the edge light device 140. In the illustrated example, the edge light device 140 includes three lighting devices 232 and three apertures 220 arranged to correspond to the lighting devices 232, respectively. For example, the edge light device 140 includes a first lighting device 232A, a second lighting device 232B, and a third lighting device 232C, and further includes a first aperture 220A, a second aperture 220B, and a third aperture 220C, which correspond to the first lighting device 232A, the second lighting device 232B, and the third lighting device 232C, respectively.

In some embodiments, the lighting devices 232 are operable to selectively turn on and radiate light primarily through their corresponding apertures 220. One or more of the lighting devices 232 are selected to emit light to a subject as necessary. In some embodiments, the lighting devices 232 are selectively activated to radiate light and create an edge light effect on subjects of different heights. For example, for a subject S1 having a height similar to the height H1 of the first aperture 220A, the first lighting device 232A is turned on to radiate light primarily through the first aperture 220A. For a subject S2 having a height similar to the height H2 of the second aperture 220B, the second lighting device 232B is turned on to radiate light primarily through the second aperture 220B. For a subject S3 having a height similar to the height H3 of the third aperture 220C, the third lighting device 232C is turned on to radiate light primarily through the third aperture 220C.

In other embodiments, the lighting devices 232 are selectively operated to provide desired edge light effects on subjects with different postures. For example, when a subject S1 having a height similar to the height H1 of the first aperture 220A stands on the subject space 138, the first lighting device 232A is turned on to provide a desired edge light effect on the upper torso (such as the head and shoulders) of the subject S1. When the subject S1 sits on a chair, the second lighting device 232B is activated to generate a desired edge effect on the upper torso of the subject S1. When the subject S1 sits on the ground, the third lighting device 232C is used to pass light primarily through the third aperture 220C to create a desired edge effect on the upper torso of the subject S1.

In yet other embodiments, the lighting devices 232 are selectively turned on to provide an edge light effect to different portions of a particular subject. For example, when an edge light effect is desired at the upper torso (e.g., the head and shoulders) of a subject S1, the first light device 232A is activated and the other light devices 232B and 232C are turned off. When an edge light effect is to be provided to the lower torso (e.g., the waist) of the subject S1, the second light device 232B is activated and the other light devices 232A and 232C are turned off. When an edge light effect is needed the hips or legs of the subject S1, the third light device 232C is activated and the other light devices 232A and 232B are turned off. Further, in other examples, any combination of the plurality of lighting devices 232 can be used to create edge light effects on different portions (either continuous or discrete) of a particular subject.

In yet other embodiments, the lighting devices 232 are selectively operated to provide an edge light effect to different areas of a particular subject. For example, when an edge light effect is needed on a limited area of a subject, only one of the first, second, and third lighting devices 232A, 232B, and 232C is turned on while the other lighting devices are deactivated. When an edge light effect is desired to a large or full area of the subject, all of the first, second, and third lighting devices 232A, 232B, and 232C can be activated. In other examples, any combination of two lighting devices among the first, second, and third lighting devices 232A, 232B, and 232C can be used to generate different areas of the subject.

Figure 11:
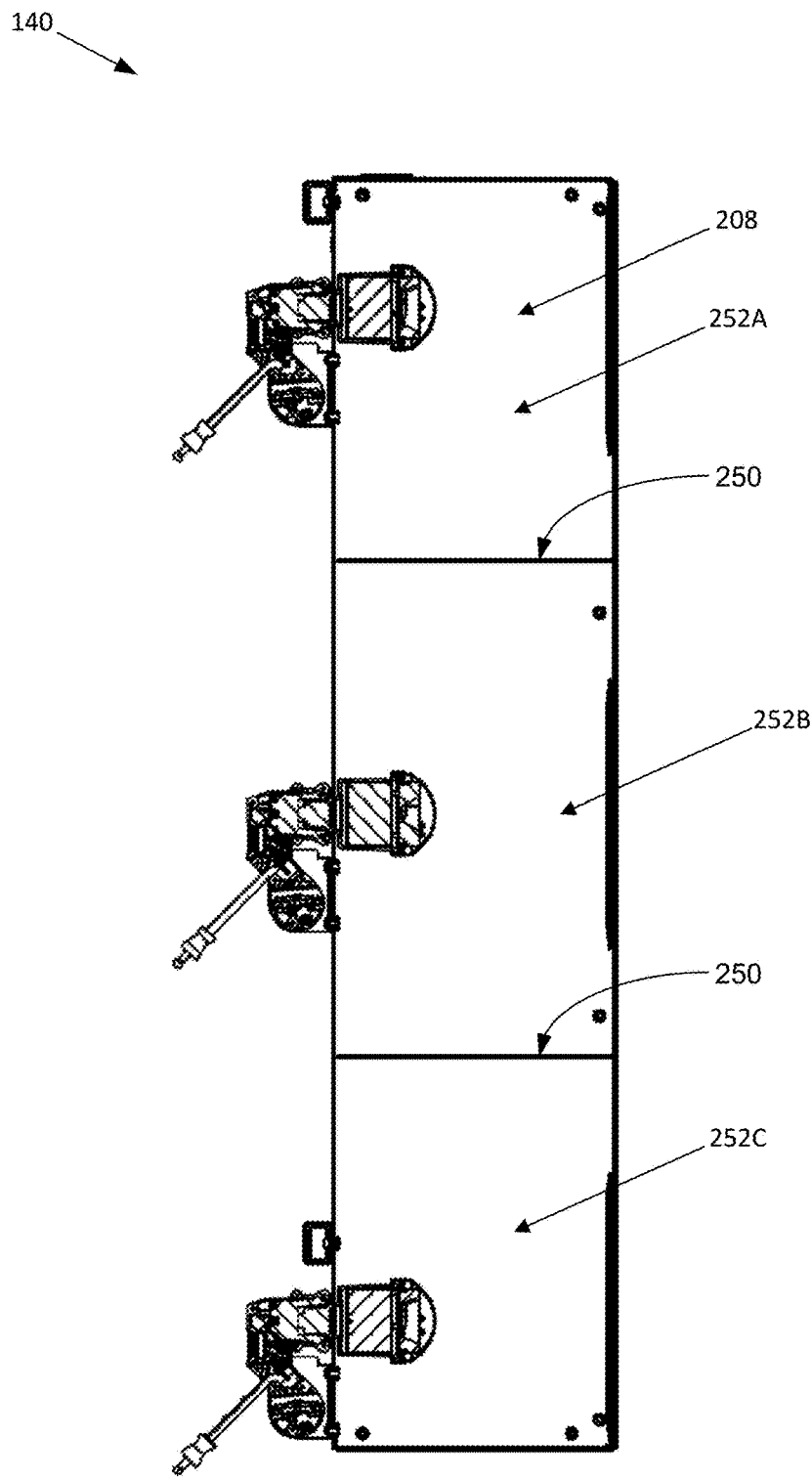
FIG. 11 is a cross sectional view of another example of the edge light device.
Figure 12:
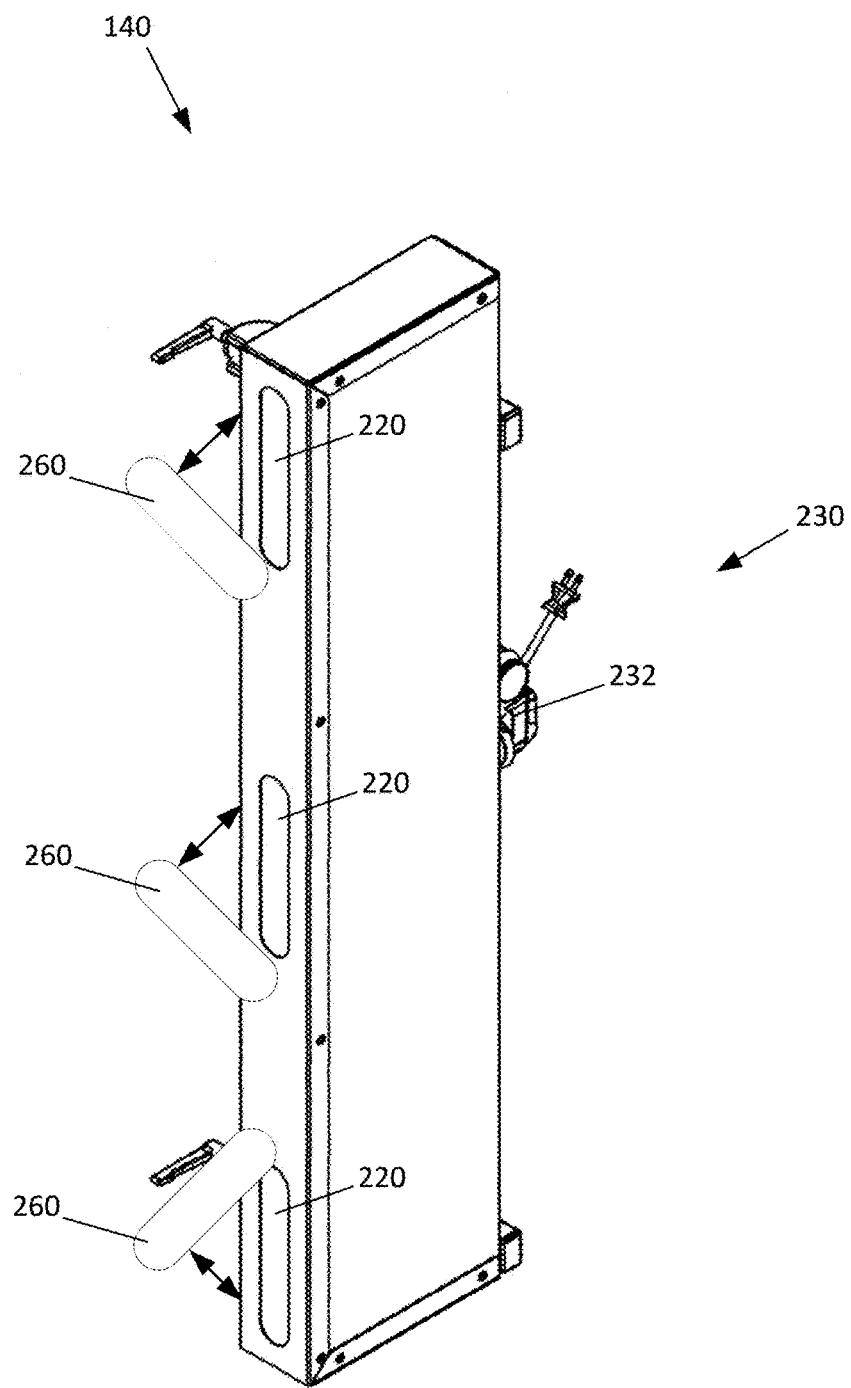
FIG. 12 is a perspective view of yet another example of the edge light device.
Figure 13:
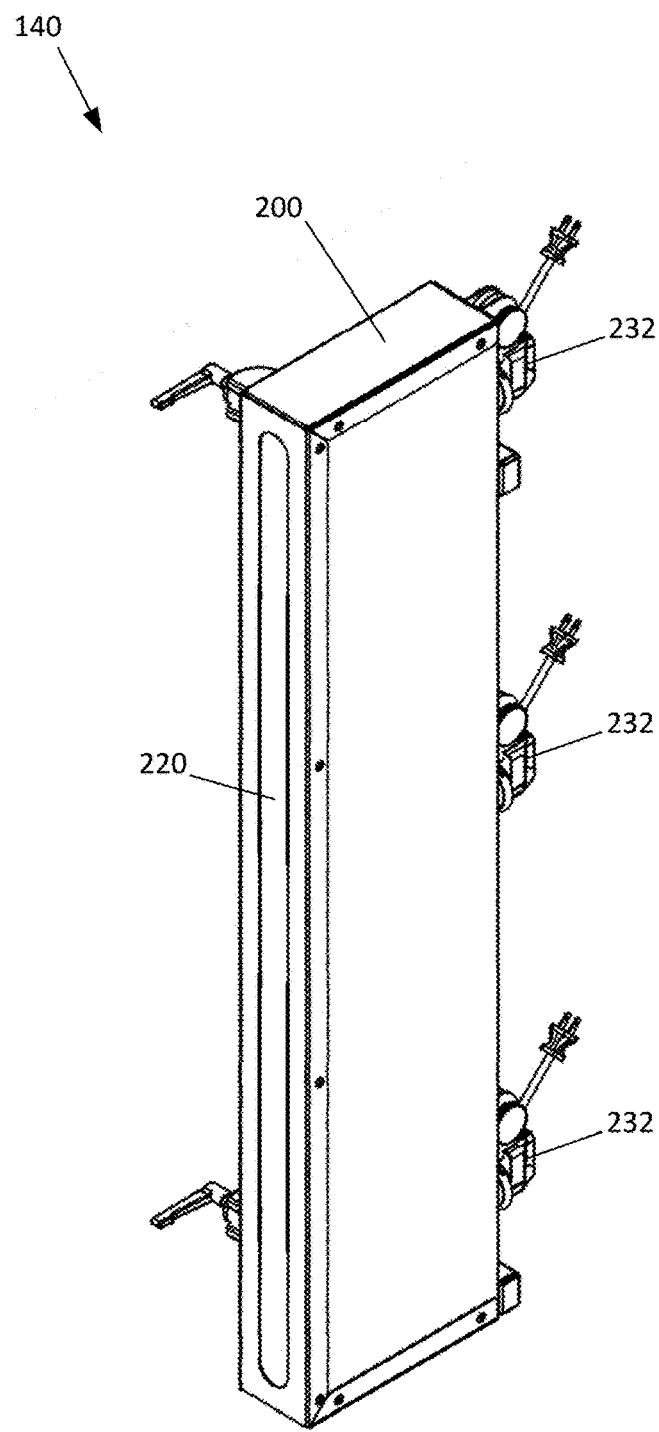
FIG. 13 is a perspective view of yet another example of the edge light device.

Referring to FIGS. 11-13, other examples of the edge light device 140 are described.

FIG. 11 is a cross sectional view of another example of the edge light device 140. In this example, the edge light device 140 is configured similarly to the edge light device illustrated in FIGS. 3-10, except that one or more dividers 250 are provided in the interior 208 of the housing 200. The dividers 250 are arranged to segment the interior of the housing 200 into a plurality of subspaces, each of which contains a set of a lighting device 232 and a corresponding aperture 220. For example, where three lighting devices 232 and three apertures 220 are provided as in FIG. 11, two dividers 250 can be arranged to define three subspaces including a first subspace 252A for the first lighting device 232A and the first aperture 220A, a second subspace 252B for the second lighting device 232B and the second aperture 220B, and a third subspace 252C for the third lighting device 232C and the third aperture 220C.

FIG. 12 is a perspective view of yet another example of the edge light device 140. In this example, the edge light device 140 is configured similarly to the edge light device illustrated in FIGS. 3-10, except that the light source 230 has a single lighting device 232 for a plurality of apertures 220. In some embodiments, a blocking cover 260 is arranged for each aperture 220. The blocking cover 260 can be operated to open and close the associated aperture 220 to selectively pass light from the lighting device 232 through one or more open apertures 220.

The blocking cover 260 is arranged in various configurations. In some embodiments, the blocking cover 260 is pivotally connected adjacent one end of the associated aperture 220 so that the aperture 220 is closed or open as the blocking cover 260 pivots. In other embodiments, the blocking cover 260 is configured to slide over the associated aperture 220 to close the aperture 220. Other configurations are also possible in yet other embodiments.

FIG. 13 is a perspective view of yet another example of the edge light device 140. In this example, the edge light device 140 is configured similarly to the edge light device illustrated in FIGS. 3-10, except that a single aperture 220 is provided with a plurality of lighting devices 232. As described above, the lighting devices 232 can be selectively operated to radiate light of different height through the aperture 220.

The elements of the edge light device 140 as described herein can be combined differently. For example, the dividers 250 in FIG. 11 can be applied to the examples of FIGS. 3-10 and 12-13. The blocking cover 260 in FIG. 12 can be applied to the examples of FIGS. 3-11 and 13.

Figure 14:
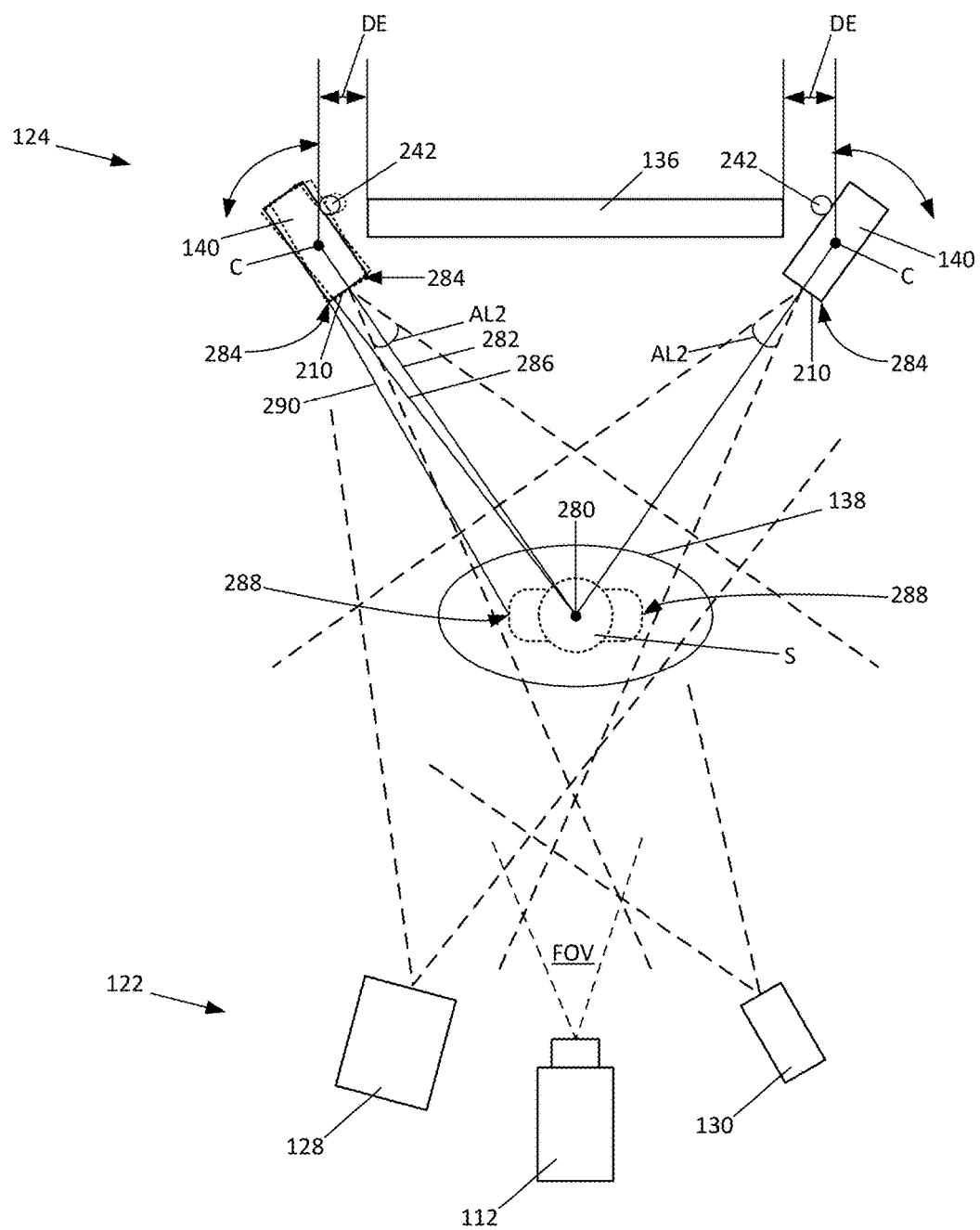
FIG. 14 illustrates an example setup of the edge light devices in the photography system.

FIG. 14 illustrates an example setup of the edge light devices 140 in the photography station 100. In some embodiments, the camera 112, the main light 128, and the fill light 130 are arranged at the forward portion 122 of the station assembly 104, and the photographic scene 136 (using the scene support 134) and the edge light devices 140 are arranged at the rearward portion 124 of the station assembly 104. In other embodiments, other lights, such as a background light, can be set up to illuminate the photographic scene 136.

In some embodiments, two edge light devices 140 are arranged adjacent the opposite sides of the photographic scene 136. In some embodiments, the edge light devices 140 are spaced apart from the photographic scene 136. For example, the edge light devices 140 are arranged such that the center of the edge light device 140 is arranged at a distance $D_E$ from the side of the photographic scene 136. In some embodiments, the distance $D_E$ ranges between about 1 inches and about 10 inches. In other embodiments, the distance $D_E$ can be shorter or longer than this range. In some embodiments, the light devices 140 need to be as close to the edge of the background as reasonably possible. The closer the light devices are to the background behind the subject, the more of a glancing blow effect they will have and increase efficiency. In some embodiments, the look to achieve is similar to the glow in the sky sunlight bouncing off a lake or road. In one example, the distance $D_E$ can be set about 3 inches to allow for clamping and enable a 7 feet wide background to fit between them.

The edge light devices 140 can be arranged with respect to a subject S in various ways. In some embodiments, the edge light device 140 is arranged such that the housing 200 (i.e., the front panel 210) of the edge light device 140 is directed toward the center 280 of the subject space 138. For example, the center C of the housing 200 (or the center line of the front panel 210) is aligned with the center 280 of the subject space 138, as illustrated with a line 282.

In other embodiments, the edge light device 140 is arranged such that one of the edges 284 of the front panel 210 of the edge light device 140 is aligned with a particular point or portion of the subject space 138. For example, one of the edges 284 of the front panel 210 of the housing 200 is aligned with the center 280 of the subject space 138, as illustrated with a line 286.

In yet other embodiments, the edge light device 140 is arranged such that one of the edges 284 of the front panel 210 of the edge light device 140 is aligned with a particular point or portion of a subject S on the subject space 138. For example, one of the edges 284 of the front panel 210 of the housing 200 is aligned with a shoulder line 288 of the subject S, as illustrated with a line 290. Other alignment methods are also possible in yet other embodiments.

Figure 15:
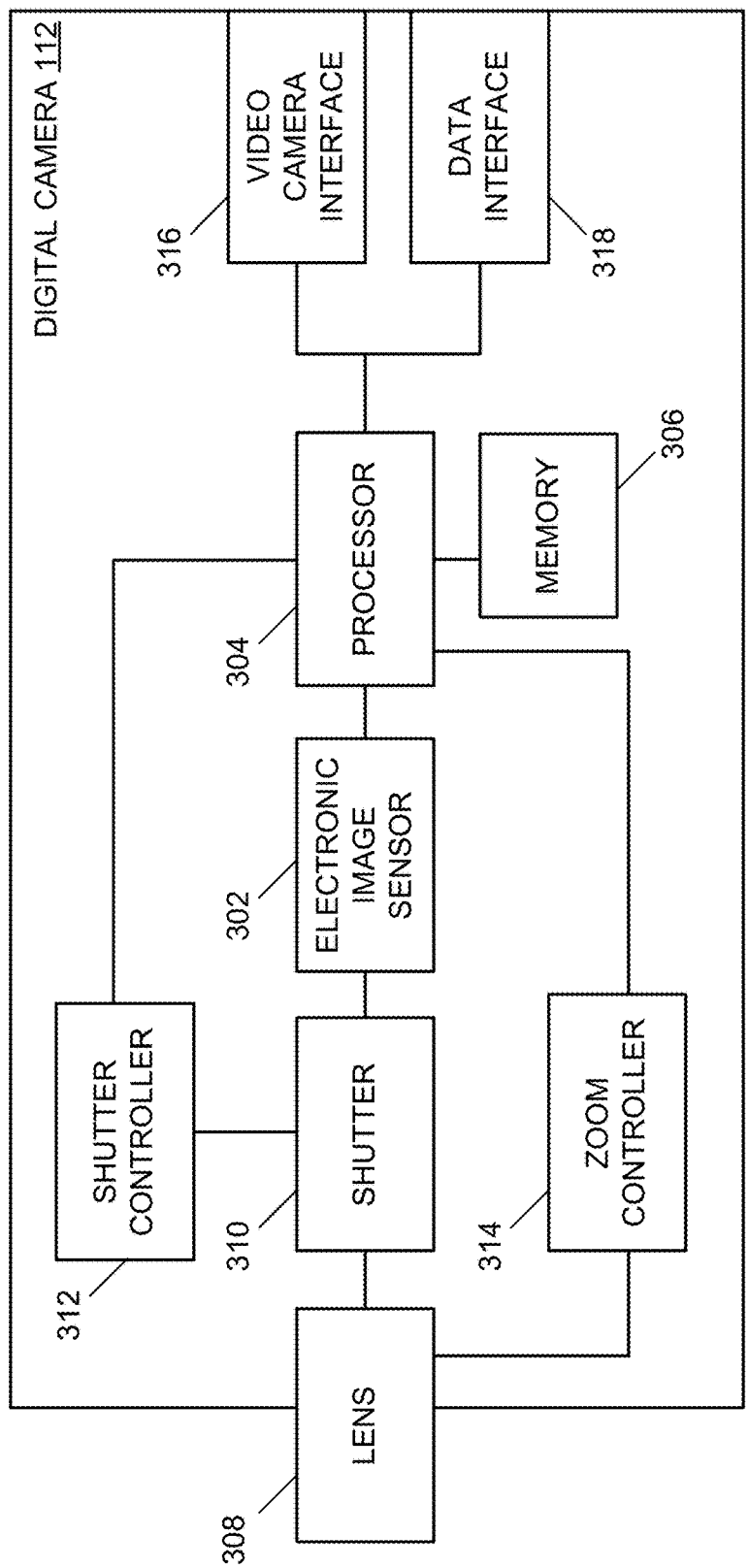
FIG. 15 is a schematic block diagram of an example camera.

FIG. 15 is a schematic block diagram of an example camera 112. The camera 112 is typically a digital camera including at least an electronic image sensor 302 for converting an optical image to an electric signal, a processor 304 for controlling the operation of the camera 112, and a memory 306 for storing the electric signal in the form of digital image data.

An example of the electronic image sensor 302 is a charge-coupled device (CCD). Another example of the electronic image sensor 302 is a complementary metal-oxide-semiconductor (CMOS) active-pixel sensor. The electronic image sensor 302 receives light from a subject and background and converts the received light into electrical signals. The signals are converted into a voltage, which is then sampled, digitized, and stored as digital image data in the memory 306.

The memory 306 can include various different forms of computer readable storage media, such as random access memory. In some embodiments, the memory 306 includes a memory card. A wide variety of memory cards are available for use in various embodiments. Examples include: a CompactFlash (CF) memory card (including type I or type II), a Secure Digital (SD) memory card, a mini Secure Digital (mini SD) memory card, a micro Secure Digital (microSD) memory card, a smart media (SM/SMC) card, a Multimedia Card (MMC), an xD-Picture Card (xD), a memory stick (MS) including any of the variations of memory sticks, an NT card, and a USB memory stick (such as a flash-type memory stick). Other embodiments include other types of memory, such as those described herein, or yet other types of memory.

In some embodiments, the camera 112 includes three main sections: a lens 308, a mechanical shutter 310, and a CCD element 302. Generally, the CCD element 302 has relatively rapid exposure speeds. However, the process of moving the captured image from the CCD element 302 to an image storage area such as the memory 306 is slower than the time to acquire the image. Accordingly, in order to reduce the time between acquiring the backlit and front-lit images as discussed herein—preferably to further reduce any motion of the foreground object in the time period between shots—some embodiments include a CCD element 302 that is an interline transfer CCD. Such elements are commercially available, and are manufactured by Eastman Kodak Company of Rochester, N.Y. under the designation KAI-11000. This type of CCD element 302 includes arrays of photodiodes interspaced with arrays of shift registers. In operation, after capturing a first image, photodiodes transfer the electrons to the adjacent shift registers and become ready thereafter to capture the next image. Because of the close proximity between the photodiodes and associated shift registers, the imaging-transfer cycles can be very short. Thus, in some embodiments, the digital camera 112 can rapidly capture a first image, transfer the first image to a memory 306 (where it is temporarily stored) and then capture a second image. After the sequence of images, both of the images can be downloaded to the appropriate longer term memory location, such as a second memory device 306.

Since the CCD element 302 continues to integrate the second image while the first image is read out, a shutter 310 is employed in front of the CCD element 302. In some embodiments, a mechanical shutter 310 is used and is synchronized by the processor 304. The shutter 310 opens prior to the capture of the first image and remains open for the duration of the second flash. It then receives a signal to close in order to eliminate further exposure from ambient light. Examples of suitable shutters 310 are those that are commercially available and manufactured by Redlake MASD LLC of Tucson, Ariz. However, other shutters 310 may be employed in other embodiments. Further, the exposure may be controlled by the lights, shutter 310, and/or a combination of the two in some embodiments.

The lens 308 is located in front of the shutter 310 and is selected to provide the appropriate photographic characteristics of light transmission, depth of focus, etc. In some embodiments, the lens 308 is selected between 50 and 350 mm, with the image taken at an f-stop generally in the range of f16 to f22. This provides a zone focus for the image. It also generally eliminates concerns regarding ambient light. However, it will be appreciated that any number of lenses, focusing, and f-stops may be employed in connection with the present invention.

To initiate the capture of the images, a remote control associated with the camera 112 can be used. In some embodiments, the remote control is connected to the controller 114, which generates a shutter release signal that is communicated to a shutter controller 312 of the camera 112. However, other embodiments use other methods and devices to initiate the image capture. For example, a button, switch or other device might be included on the controller 114 or connected to the camera 112. Still further, the computing device 116 is used in some embodiments to initiate the process.

A zoom controller 314 is also provided in some embodiments to mechanically adjust the lens 308 to cause the digital camera 112 to zoom in and out on a subject. In some embodiments, the remote control is used to zoom in and out on the subject. Signals from the remote control are communicated to the controller 114, which communicates the request to the zoom controller 314 of the digital camera 112. The zoom controller 314 typically includes a motor that adjusts the lens 308 accordingly.

In some embodiments, the digital camera 112 includes a video camera interface 316 and a data interface 318. The video camera interface 316 communicates live video data from the digital camera 112 to the controller 114 (or the computing device 116) in some embodiments. The data interface 318 is a data communication interface that sends and receives digital data to communicate with another device, such as the controller 114 or the computing device 116. For example, in some embodiments, the data interface 318 receives image capture messages from the controller 114 that instruct the digital camera 112 to capture one or more digital images. The data interface 318 is also used in some embodiments to transfer captured digital images from the memory 306 to another device, such as the controller 114 or the computing device 116. Examples of the video camera interface 316 and the data interface 318 are USB interfaces. In some embodiments, the video camera interface 316 and the data interface 318 are the same, while in other embodiments they are separate interfaces.

Figure 16:
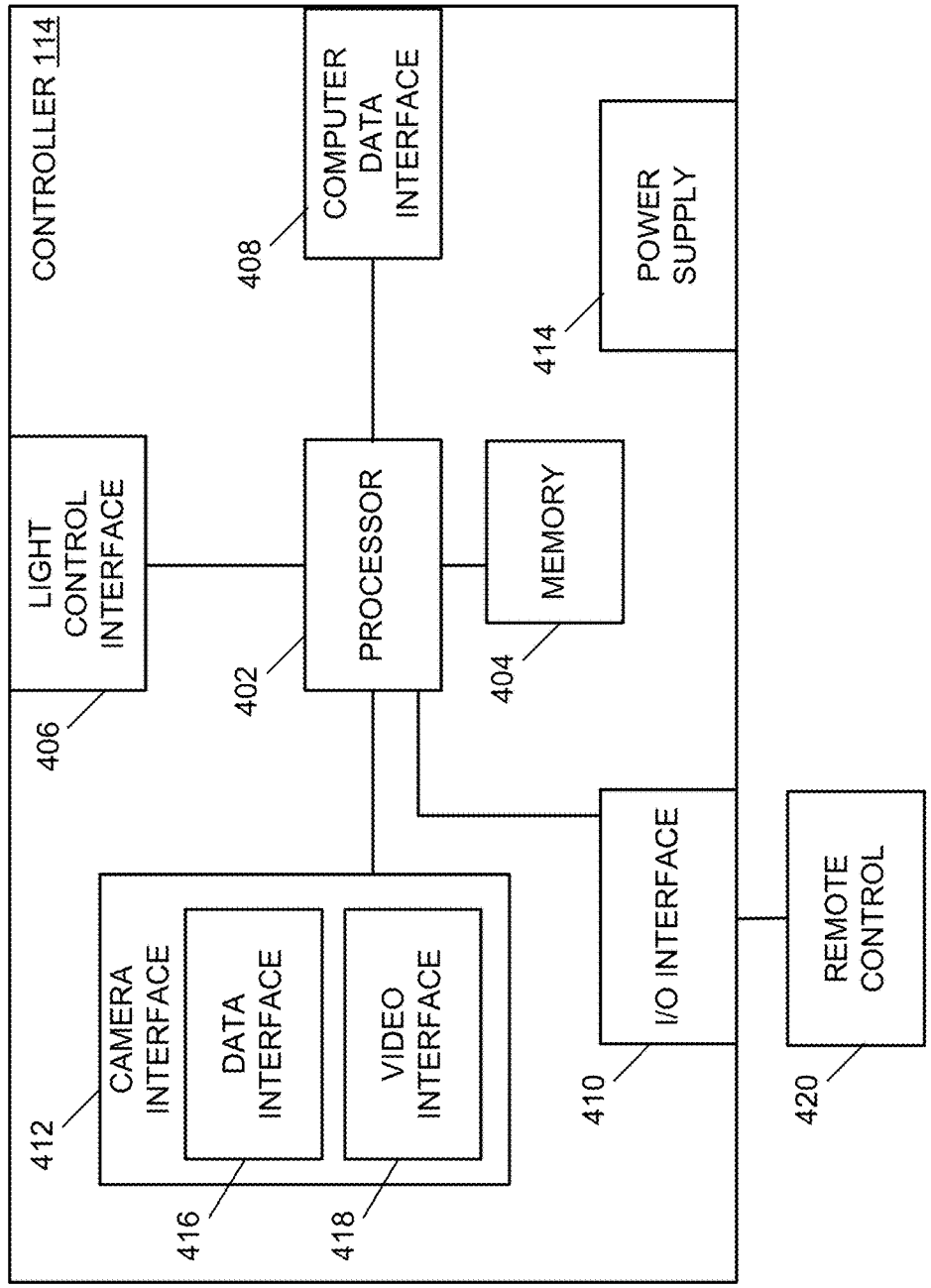
FIG. 16 is a schematic block diagram of an example controller.

FIG. 16 is a schematic block diagram of an example controller 114. In this example, the controller 114 includes a processor 402, a memory 404, a light control interface 406, a computer data interface 408, an input/output interface 410, a camera interface 412, and a power supply 414. In some embodiments, the camera interface 412 includes a data interface 416 and a video interface 418.

The processor 402 performs control operations of the controller 114, and interfaces with the memory 404. Examples of suitable processors and memory are described herein.

The light control interface 406 allows the controller 114 to control the operation of one or more lights, such as the main light 128, the fill light 130, the edge light 140, and any other lights (e.g., a background light). In some embodiments, the light control interface 406 is a send only interface that does not receive return communications from the lights. Other embodiments permit bidirectional communication. The light control interface 406 is operable to selectively illuminate one or more lights at a given time. The controller 114 operates to synchronize the illumination of the lights with the operation of the camera 112.

The computer data interface 408 allows the controller 114 to send and receive digital data with the computing device 116. An example of the computer data interface 408 is a universal serial bus interface, although other communication interfaces are used in other embodiments, such as a wireless or serial bus interface.

One or more input devices, such as a remote control 420, are coupled the processing device 402 through the input/output interface 410. The input devices can be connected by any number of the input/output interfaces 410 in various embodiments, such as a parallel port, serial port, game port, universal serial bus, or wireless interface.

The camera interface 412 allows the controller 114 to communicate with the camera 112. In some embodiments, the camera interface 412 includes a data interface 416 that communicates with the data interface 318 of the camera 112 (shown in FIG. 15), and a video interface 418 that communicates with the video camera interface 316 of the camera 112 (also shown in FIG. 15). Examples of such interfaces include universal serial bus interfaces. Other embodiments include other interfaces.

In some embodiments a power supply 414 is provided to receive power, such as through a power cord, and to distribute the power to other components of the photography station 100, such as through one or more additional power cords. Other embodiments include one or more batteries. Further, in some embodiments, the controller 114 receives power from another device.

In some embodiments, the controller 114 is arranged and configured to provide a single trigger pulse at the start of the integration of the first image. This pulse may be used by the controller 114 to synchronize the lights. In one embodiment, the front or rising edge is used to trigger the edge lights 140 and/or any other lights (e.g., the background light) at the rearward portion, while the trailing or falling edge can trigger the main light 128 and/or the fill light 130. Other types of triggers and pulses may be used. For example, the controller 114 uses two different pulses in some embodiments, etc. Yet other embodiments communicate digital messages that are used to synchronize and control the various operations.

Figure 17:
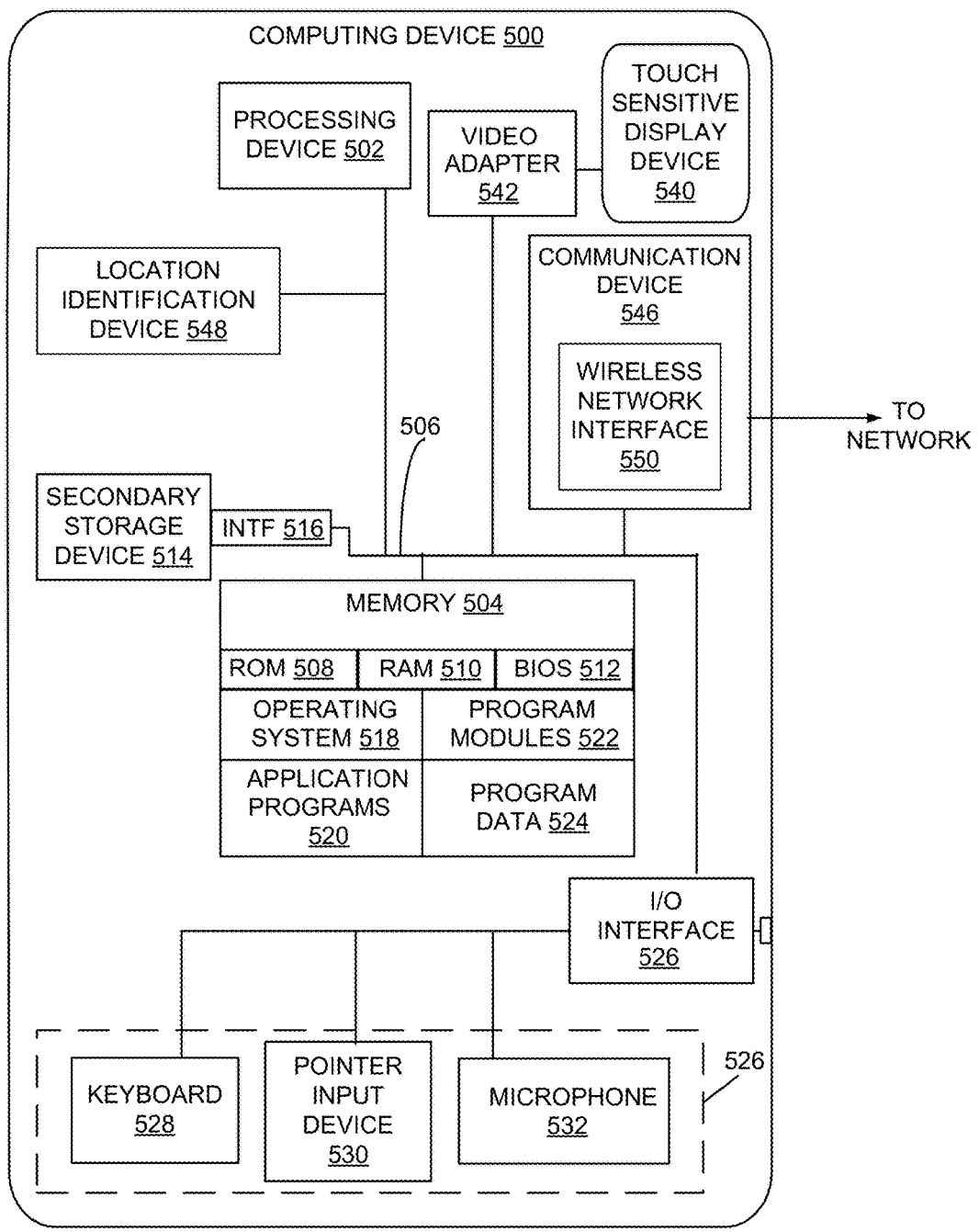
FIG. 17 illustrates an exemplary architecture of a computing device which can be used in the present disclosure.

FIG. 17 illustrates an exemplary architecture of a computing device 500 which can be used in the present disclosure. The computing device 500 illustrated in FIG. 17 is used to execute the operating system, application programs, and software modules (including the software engines) described herein.

The computing device 500 can be of various types. In some embodiments, the computing device 500 is a desktop computer, a laptop computer, or other devices configured to process digital instructions. In other embodiments, the computing device 500 is a mobile computing device. Examples of the computing device 500 as a mobile computing device include a mobile device (e.g., a smart phone and a tablet computer), a wearable computer (e.g., a smartwatch and a head-mounted display), a personal digital assistant (PDA), a handheld game console, a portable media player, a ultra-mobile PC, a digital still camera, a digital video camera, and other mobile devices.

In some examples, at least a portion of the computing device 500 can be used to implement computing devices used in the photography station 100. It is also recognized that at least some of the architecture illustrated in FIG. 17 can also be implemented in various computing devices used to achieve aspects of the present disclosure. For example, the controller 114 and the computing device 116 can be configured similarly to the architecture of FIG. 17.

The computing device 500 includes, in some embodiments, at least one processing device 502, such as a central processing unit (CPU). A variety of processing devices are available from a variety of manufacturers, for example, Intel or Advanced Micro Devices. In this example, the computing device 500 also includes a system memory 504, and a system bus 506 that couples various system components including the system memory 504 to the processing device 502. The system bus 506 is one of any number of types of bus structures including a memory bus, or memory controller; a peripheral bus; and a local bus using any of a variety of bus architectures.

The system memory 504 includes read only memory 508 and random access memory 510. A basic input/output system 512 containing the basic routines that act to transfer information within the computing device 500, such as during start up, is typically stored in the read only memory 508.

The computing device 500 also includes a secondary storage device 514 in some embodiments, such as a hard disk drive, for storing digital data. The secondary storage device 514 is connected to the system bus 506 by a secondary storage interface 516. The secondary storage devices and their associated computer readable media provide nonvolatile storage of computer readable instructions (including application programs and program modules), data structures, and other data for the computing device 500.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media.

A number of program modules can be stored in secondary storage device 514 or memory 504, including an operating system 518, one or more application programs 520, other program modules 522, and program data 524.

In some embodiments, the computing device 500 includes input devices to enable a user to provide inputs to the computing device 500. Examples of input devices 526 include a keyboard 528, a pointer input device 530, a microphone 532, and a touch sensitive display 540. Other embodiments include other input devices. The input devices are often connected to the processing device 502 through an input/output interface 538 that is coupled to the system bus 506. These input devices 526 can be connected by any number of input/output interfaces, such as a parallel port, serial port, game port, or a universal serial bus. Wireless communication between input devices and interface 538 is possible as well, and includes infrared, BLUETOOTH® wireless technology, 802.11a/b/g/n, cellular, or other radio frequency communication systems in some possible embodiments.

In this example embodiment, a touch sensitive display device 540 is also connected to the system bus 506 via an interface, such as a video adapter 542. The touch sensitive display device 540 includes touch sensors for receiving input from a user when the user touches the display. Such sensors can be capacitive sensors, pressure sensors, or other touch sensors. The sensors not only detect contact with the display, but also the location of the contact and movement of the contact over time. For example, a user can move a finger or stylus across the screen to provide written inputs. The written inputs are evaluated and, in some embodiments, converted into text inputs.

In addition to the display device 540, the computing device 500 can include various other peripheral devices (not shown), such as speakers or a printer.

The computing device 500 further includes a communication device 546 configured to establish communication across the network. In some embodiments, when used in a local area networking environment or a wide area networking environment (such as the Internet), the computing device 500 is typically connected to the network through a network interface, such as a wireless network interface 550. Other possible embodiments use other wired and/or wireless communication devices. For example, some embodiments of the computing device 500 include an Ethernet network interface, or a modem for communicating across the network. In yet other embodiments, the communication device 546 is capable of short-range wireless communication. Short-range wireless communication is one-way or two-way short-range to medium-range wireless communication. Short-range wireless communication can be established according to various technologies and protocols. Examples of short-range wireless communication include a radio frequency identification (RFID), a near field communication (NFC), a Bluetooth technology, and a Wi-Fi technology.

The computing device 500 typically includes at least some form of computer-readable media. Computer readable media includes any available media that can be accessed by the computing device 500. By way of example, computer-readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 500. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 17 is also an example of programmable electronics, which may include one or more such computing devices, and when multiple computing devices are included, such computing devices can be coupled together with a suitable data communication network so as to collectively perform the various functions, methods, or operations disclosed herein.

Referring again to FIG. 17, the computing device 500 can include a location identification device 548. The location identification device 548 is configured to identify the location or geolocation of the computing device 500. The location identification device 548 can use various types of geolocating or positioning systems, such as network-based systems, handset-based systems, SIM-based systems, Wi-Fi positioning systems, and hybrid positioning systems. Network-based systems utilize service provider's network infrastructure, such as cell tower triangulation. Handset-based systems typically use the Global Positioning System (GPS). Wi-Fi positioning systems can be used when GPS is inadequate due to various causes including multipath and signal blockage indoors. Hybrid positioning systems use a combination of network-based and handset-based technologies for location determination, such as Assisted GPS.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. An edge light assembly for a photography system, the edge light assembly comprising:
    a housing, having an inner surface made of non-reflective material defining an interior, the housing configured to at least partially receive a light source, the light source configured to emit light, the housing including:
        a light blocker at least partially surrounding the light source and blocking the light from reaching a camera of the photography system; and
        at least one aperture provided at the housing and configured to define a light passage through which the light is directed toward a subject space between a background and the camera.

2. The edge light assembly of claim 1, further comprising the light source mounted to the housing.

3. The edge light assembly of claim 1, further comprising a support device configured to detachably mount the housing to a light stand.

4. The edge light assembly of claim 1, wherein the light blocker includes a front panel, a rear panel, and side panels, the front panel, the rear panel, and the side panels defining the interior of the housing.

5. The edge light assembly of claim 4, wherein the housing provides a plurality of apertures at the front panel, the plurality of apertures spaced apart at a predetermined distance, and wherein the edge light assembly is configured to pass light from the light source through at least one of the plurality of apertures.

6. The edge light assembly of claim 5, the edge light assembly configured to pass light from the light source selectively through at least one of the plurality of apertures.

7. The edge light assembly of claim 2, wherein the light source includes a plurality of lighting elements mounted to the housing, the plurality of lighting elements spaced apart at a predetermined distance, wherein the housing provides a plurality of apertures at the front panel, the plurality of apertures corresponding to the plurality of lighting elements, respectively.

8. The edge light assembly of claim 7, wherein the plurality of lighting elements are independently operable.

9. The edge light assembly of claim 7, wherein the plurality of apertures are arranged symmetrically with respect to a longitudinal center axis of the front panel of the housing.

10. The edge light assembly of claim 7, wherein the plurality of lighting elements are arranged symmetrically with respect to a longitudinal center axis of the housing.

11. The edge light assembly of claim 4, wherein the housing includes a light socket configured to mount the light source at the rear panel.

12. The edge light assembly of claim 2, wherein the light source includes a flashlight bulb.

13. A photography system comprising:
a digital camera arranged and configured to capture a digital image of a subject;
a foreground light assembly;
an edge light assembly including a housing, having an inner surface made of non-reflective material defining an interior, the housing configured to at least partially receive a light source, the light source configured to emit light, the housing including:
a light blocker at least partially surrounding the light source and blocking the light from reaching a camera of the photography system; and
at least one aperture provided at the housing and configured to define a light passage through which the light is directed toward a subject space between a background and the camera; and
a controller operable to control the photography system to:
illuminate the subject with the foreground light assembly;
illuminate the subject with the edge light assembly; and
capture a digital image with the digital camera.

14. The photography system of claim 13, further comprising:
a background; and
a background light assembly;
wherein the controller is further operable to control the photography system to:
illuminate the subject with the background light assembly.

15. A photography method comprising:
setting up a photography station by:
arranging a digital camera with respect to a subject space;
arranging a foreground light assembly with respect to the subject space; and
aligning an edge light assembly with the subject space, the edge light assembly including a housing having an inner surface made of non-reflective material defining an interior, the housing configured to at least partially receive a light source, the light source configured to emit light, the housing including:
a light blocker at least partially surrounding the light source and blocking the light from reaching the camera of the photography system; and
at least one aperture provided at the housing and configured to define a light passage through which the light is directed toward the subject space; and
operating a controller to synchronize operations of the digital camera, the foreground light assembly, and the edge light assembly.

16. The photography method of claim 15, wherein aligning the edge light assembly comprises:
aligning an edge of the housing of the edge light assembly with the subject space.

17. The photography method of claim 15, wherein aligning the edge light assembly comprises:
aligning a center of the housing of the edge light assembly with the subject space.

18. The photography method of claim 15, wherein the light blocker includes a front panel, a rear panel, and side panels, the front panel, the rear panel, and the side panels defining the interior of the housing.

19. The photography method of claim 15, wherein the housing provides a plurality of apertures at the front panel, the plurality of apertures spaced apart at a predetermined distance, and wherein the edge light assembly configured to pass light from the light source through at least one of the plurality of apertures.

* * * * *